US012055336B2

(12) United States Patent
Li et al.

(10) Patent No.: US 12,055,336 B2
(45) Date of Patent: Aug. 6, 2024

(54) REFRIGERATOR WITH SWITCHABLE HINGE ASSEMBLY

(71) Applicants: QINGDAO HAIER REFRIGERATOR CO., LTD., Qingdao (CN); HAIER SMART HOME CO., LTD., Qingdao (CN)

(72) Inventors: Kang Li, Qingdao (CN); Enpin Xia, Qingdao (CN); Xiaobing Zhu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 215 days.

(21) Appl. No.: 17/637,795

(22) PCT Filed: Aug. 27, 2020

(86) PCT No.: PCT/CN2020/111574

§ 371 (c)(1),
(2) Date: Feb. 23, 2022

(87) PCT Pub. No.: WO2021/037096

PCT Pub. Date: Mar. 4, 2021

(65) Prior Publication Data

US 2022/0282539 A1 Sep. 8, 2022

(30) Foreign Application Priority Data

Aug. 28, 2019 (CN) ......................... 201910803424.4

(51) Int. Cl.

*F25D 23/02* (2006.01)
*E05D 3/18* (2006.01)
*E05D 7/084* (2006.01)

(52) U.S. Cl.

CPC ............. *F25D 23/028* (2013.01); *E05D 3/18* (2013.01); *E05D 7/084* (2013.01); (Continued)

(58) Field of Classification Search

CPC ............. F25D 23/028; F25D 2323/024; F25D 2323/021; E05D 3/18; E05D 7/0407; (Continued)

(56) References Cited

U.S. PATENT DOCUMENTS 2,793,387 A * 5/1957 Odell ........................ E05D 3/18 16/358
2,867,839 A * 1/1959 Squire ....................... E05D 3/18 16/358

(Continued)

FOREIGN PATENT DOCUMENTS

AU 431315 B 12/1972
CN 201155900 Y 11/2008

(Continued)

*Primary Examiner* — Hiwot E Tefera
(74) *Attorney, Agent, or Firm* — Cheng-Ju Chiang

(57) ABSTRACT

A refrigerator with a switchable hinge assembly which includes a cabinet (10), a door (20) and the hinge assembly (30) for connecting the cabinet (10) and the door (20), wherein the hinge assembly (30) includes a plurality of hinge parts (31,32), and a switching assembly (40); when the door (20) is in an opening process, the switching assembly (40) controls the plurality of hinge parts (31,32) to successively operate in a first sequence, and when the door (20) is in a closing process, the switching assembly (40) controls the plurality of hinge parts (31,32) to successively operate in a second sequence, and the first sequence is opposite to the second sequence. An opening-closing freedom degree of the door (20) may be increased by the refrigerator with the switchable hinge assembly, and various motion tracks may be generated to adapt to different application scenarios.

14 Claims, 26 Drawing Sheets

(52) U.S. Cl.
CPC ..... *E05Y 2900/31* (2013.01); *F25D 2323/021* (2013.01); *F25D 2323/024* (2013.01)

(58) Field of Classification Search
CPC ........... E05D 5/14; E05D 7/081; E05D 5/046; E05D 5/10; E05D 5/12; E05D 11/06; E05D 7/085; E05D 7/084; E05Y 2900/31; E05F 5/06
See application file for complete search history.

(56) References Cited

U.S. PATENT DOCUMENTS

| | | | | | |
|---|---|---|---|---|---|
| 3,001,225 | A * | 9/1961 | Squire | E05F 1/1276 16/358 |
| 3,065,498 | A * | 11/1962 | Johnson | E05D 3/18 16/359 |
| 3,083,403 | A * | 4/1963 | Van Noord | E05D 3/18 16/361 |
| 3,201,821 | A | 8/1965 | Ruckstuhl | |
| 4,151,681 | A | 5/1979 | Roberts | |
| 4,609,234 | A | 9/1986 | Naniwa et al. | |
| 5,265,954 | A | 11/1993 | Keil | |
| 9,380,863 | B2 * | 7/2016 | Sakanoue | B60N 3/004 |
| 2003/0132689 | A1 * | 7/2003 | Shin | E05D 3/18 312/405 |
| 2008/0301909 | A1 * | 12/2008 | Chien | G06F 1/1624 16/362 |
| 2012/0025686 | A1 * | 2/2012 | Darney | E05D 3/18 312/405 |
| 2013/0264930 | A1 * | 10/2013 | Kim | E05F 1/00 312/405 |
| 2014/0232250 | A1 * | 8/2014 | Kim | F25D 23/028 312/292 |
| 2016/0252291 | A1 * | 9/2016 | Kikuchi | F25D 23/028 312/405 |
| 2019/0186183 | A1 * | 6/2019 | He | E05D 5/04 |

FOREIGN PATENT DOCUMENTS

| | | | | |
|---|---|---|---|---|
| CN | 101501288 | A | 8/2009 | |
| CN | 102062510 | A | 5/2011 | |
| CN | 201954901 | U | 8/2011 | |
| CN | 104265103 | A | 1/2015 | |
| CN | 105546911 | A | 5/2016 | |
| CN | 105588398 | A | 5/2016 | |
| CN | 107288463 | A * | 10/2017 | E05D 11/06 |
| CN | 206600959 | U | 10/2017 | |
| CN | 107630610 | A | 1/2018 | |
| CN | 107883661 | A | 4/2018 | |
| CN | 107883662 | A | 4/2018 | |
| CN | 108106312 | A | 6/2018 | |
| CN | 108253711 | A | 7/2018 | |
| CN | 108286860 | A | 7/2018 | |
| CN | 108302856 | A | 7/2018 | |
| CN | 108468488 | A | 8/2018 | |
| CN | 108661470 | A | 10/2018 | |
| CN | 108868422 | A | 11/2018 | |
| CN | 109470000 | A | 3/2019 | |
| CN | 109470019 | A | 3/2019 | |
| CN | 208605065 | U | 3/2019 | |
| CN | 110068185 | A | 7/2019 | |
| CN | 110068186 | A | 7/2019 | |
| DE | 102011116573 | A1 | 4/2012 | |
| DE | 102006025815 | B4 | 9/2013 | |
| EP | 3026375 | A1 | 6/2016 | |
| EP | 2960411 | B1 | 8/2019 | |
| GB | 2128244 | B | 11/1985 | |
| JP | 2000-18812 | A | 1/2000 | |
| JP | 2005146625 | A * | 6/2005 | E05D 7/081 |
| JP | 2005-299314 | A | 10/2005 | |
| JP | 2009-114710 | A | 5/2009 | |
| JP | 2013-7193 | A | 1/2013 | |
| JP | 2013-91900 | A | 5/2013 | |
| JP | 2013-256829 | A | 12/2013 | |
| JP | 2013256829 | A * | 12/2013 | E05D 7/081 |
| JP | 6062164 | B2 | 1/2017 | |
| KR | 10-2010-0054353 | A | 5/2010 | |
| KR | 10-2010-0107161 | A | 10/2010 | |
| WO | 2006/098591 | A1 | 9/2006 | |

* cited by examiner

REFRIGERATOR WITH SWITCHABLE HINGE ASSEMBLY

The present application claims priority to Chinese Patent Application No. 201910803424.4, entitled "Refrigerator with Switchable Hinge Assembly", filed on Aug. 28, 2019, the disclosure of which is incorporated herein by reference in its entirety.

TECHNICAL FIELD

The present invention relates to the field of household appliance technologies, and in particular, to a refrigerator with a switchable hinge assembly.

BACKGROUND

Usually, a refrigerator and a door move relatively by means of a fixed hinge part, thus greatly limiting an opening-closing freedom degree of the door; that is, a motion track of the door is unable to be freely controlled to adapt to different application scenarios.

For example, in recent years, with progress of society and an improvement of people's living standard, placement positions and modes of the refrigerators in homes are more and more emphasized by common users, and for current home decoration styles, part of the homes pursue style integration, the refrigerator is required to be placed in a cupboard to form a so-called embedded refrigerator device, the refrigerator is called an embedded refrigerator, and the current refrigerator is difficult to adapt to the embedded application scenario.

In view of this, the existing refrigerator is necessary to be improved to solve the above-mentioned problem.

SUMMARY

An object of the present invention is to provide a refrigerator with a switchable hinge assembly, which may effectively increase an opening-closing freedom degree of a door.

To implement one of the above inventive objectives, an embodiment of the present invention provides a refrigerator with a switchable hinge assembly, including: a cabinet, a door for opening and closing the cabinet, and the hinge assembly for connecting the cabinet and the door, the hinge assembly includes a plurality of hinge parts, and a switching assembly; when the door is in an opening process, the switching assembly controls the plurality of hinge parts to successively operate in a first sequence, and when the door is in a closing process, the switching assembly controls the plurality of hinge parts to successively operate in a second sequence, and the first sequence is opposite to the second sequence.

As a further improvement of an embodiment of the present invention, the cabinet includes an accommodating chamber and a pivoting side connected with the hinge assembly, and when the door is in the opening process, the hinge assembly at least drives the door to move from the pivoting side towards the accommodating chamber.

As a further improvement of an embodiment of the present invention, the hinge assembly includes a first hinge part and a second hinge part, the switching assembly is connected with the first hinge part and the second hinge part, the first hinge part is fixed to the cabinet, and the second hinge part is fixed to the door; when the door is in the opening process, the first hinge part moves relative to the switching assembly first, and then, the second hinge part moves relative to the switching assembly; when the door is in a closing process, the second hinge part moves relative to the switching assembly first, and then, the first hinge part moves relative to the switching assembly.

As a further improvement of an embodiment of the present invention, the switching assembly includes a first fitting part and a second fitting part; when the door is opened from a closed state to a first opening angle, the first hinge part and the first fitting part move relatively, and the second fitting part limits the second hinge part; when the door is continuously opened from the first opening angle to a second opening angle, the second hinge part is released from the limit of the second fitting part, and the first fitting part limits the first hinge part; when the door is continuously opened from the second opening angle to a maximum opening angle, the second hinge part and the second fitting part move relatively.

As a further improvement of an embodiment of the present invention, the switching assembly includes a first switching part and a second switching part which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second hinge part is released from the limit of the second fitting part, and the first fitting part limits the first hinge part.

As a further improvement of an embodiment of the present invention, the first switching part includes a first lining, a first sliding sheet and a first bushing which are stacked sequentially, and the second switching part includes a second lining, a second sliding sheet and a second bushing which are stacked sequentially; the first lining, the first bushing, the second lining and the second bushing are made of plastic, and the first sliding sheet and the second sliding sheet are made of metal.

As a further improvement of an embodiment of the present invention, the first switching part further includes a first decorative sheet covering peripheries of the first lining, the first sliding sheet, and the first bushing, the second switching part further includes a second decorative sheet covering peripheries of the second lining, the second sliding sheet, and the second bushing, and the first decorative sheet and the second decorative sheet are separated from each other.

As a further improvement of an embodiment of the present invention, the first hinge part and the first fitting part move relatively by a first shaft set and a first groove set which are fitted with each other, and the second hinge part and the second fitting part move relatively by a second shaft set and a second groove set which are fitted with each other.

As a further improvement of an embodiment of the present invention, the first shaft set includes a first shaft, the first groove set includes a first groove fitted with the first shaft, and/or the second shaft set comprises a third shaft, and the second groove set comprises a third groove fitted with the third shaft.

As a further improvement of an embodiment of the present invention, the first shaft set includes a first shaft and a second shaft, the first groove set includes a first groove fitted with the first shaft and a second groove fitted with the second shaft, the second shaft set includes a third shaft and a fourth shaft, and the second groove set includes a third groove fitted with the third shaft and a fourth groove fitted with the fourth shaft.

As a further improvement of an embodiment of the present invention, the first hinge part includes the first shaft and the second shaft, the first fitting part includes the first groove and the second groove, the second fitting part includes the third shaft and the fourth shaft, and the second hinge part includes the third groove and the fourth groove.

As a further improvement of an embodiment of the present invention, the first groove includes a first upper groove located at the first switching part and a first lower groove located at the second switching part, the first upper groove includes a first upper free section, and the first lower groove includes a first lower free section; the second groove includes a second upper groove located at the first switching part and a second lower groove located at the second switching part, the second upper groove includes a second upper free section, the second lower groove includes a second lower free section, the third groove includes a third free section, the fourth groove comprises a fourth free section, the first groove set comprises a locking section, and the second groove set includes a limiting section; when the door is opened from a closed state to a first opening angle, the first switching part and the second switching part are relatively stationary, the first upper free section and the first lower free section are overlapped to form a first free section, the second upper free section and the second lower free section are overlapped to form a second free section, the first shaft moves at the first free section, the second shaft moves at the second free section, and the third shaft and/or the fourth shaft are/is limited at the limiting section, such that the switching assembly limits the second hinge part; when the door is continuously opened from the first opening angle to a second opening angle, the first switching part and the second switching part move relatively, such that the second hinge part is released from the limit of the switching assembly, and the first shaft and/or the second shaft are/is limited at the locking section, such that the switching assembly limits the first hinge part; when the door is continuously opened from the second opening angle to a maximum opening angle, the third shaft moves at the third free section, and the fourth shaft moves at the fourth free section.

As a further improvement of an embodiment of the present invention, the locking sections include a first upper locking section located at the first upper groove, a first lower locking section located at the first lower groove, a second upper locking section located at the second upper groove, and a second lower locking section located at the second lower groove, and the limiting section includes a fourth limiting section located at the fourth groove; when the door is opened from the closed state to the first opening angle, the fourth shaft is limited at the fourth limiting section; when the door is continuously opened from the first opening angle to the second opening angle, the first shaft is limited at the first upper locking section and the first lower locking section at the same time, the second shaft is limited at the second upper locking section and the second lower locking section at the same time, and the fourth shaft is separated from the fourth limiting section.

As a further improvement of an embodiment of the present invention, the first upper locking section and the first lower locking section are always staggered, and the second upper locking section and the second lower locking section are always staggered.

As a further improvement of an embodiment of the present invention, the first switching part and the second switching part are fitted and connected with each other by a fifth shaft, and when the door is continuously opened from the first opening angle to the second opening angle, the first shaft moves to the locking section around the fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

Compared with a prior art, the present invention has the following beneficial effects: with the hinge assembly and the refrigerator according to an embodiment of the present invention, the opening-closing freedom degree of the door may be increased, and various motion tracks may be generated to adapt to different application scenarios.

DETAILED DESCRIPTION

Figure 1:
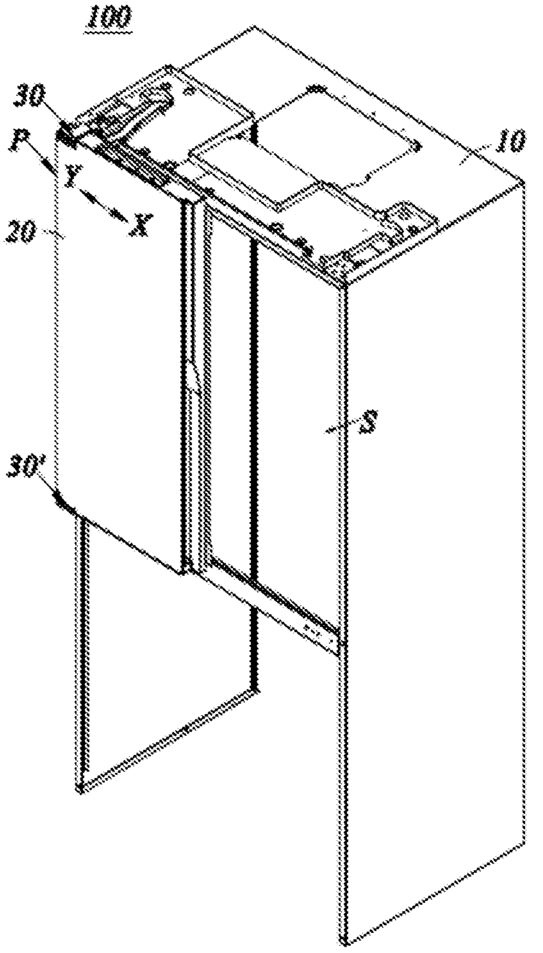
FIG. 1 is a perspective view of a refrigerator according to first to fourth embodiments of the present invention in a closed state.
Figure 2:
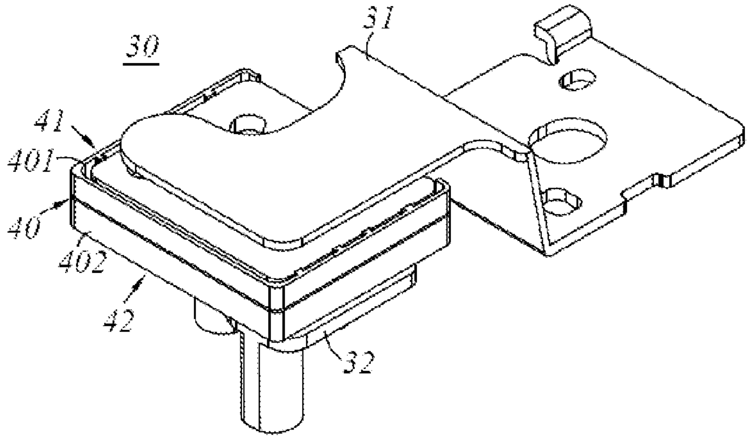
FIG. 2 is a perspective view of a hinge assembly in the first to fourth embodiments of the present invention in the closed state from a first perspective.
Figure 3:
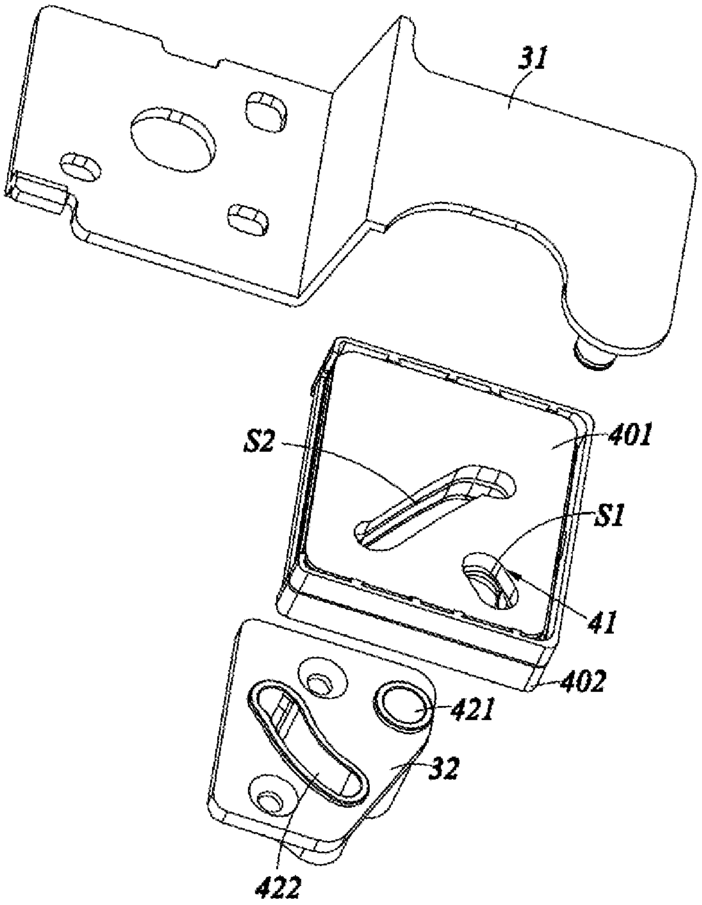
FIGS. 3 to 5 are exploded views of the hinge assembly in the first to fourth embodiments of the present invention in different states from the first perspective.
Figure 4:
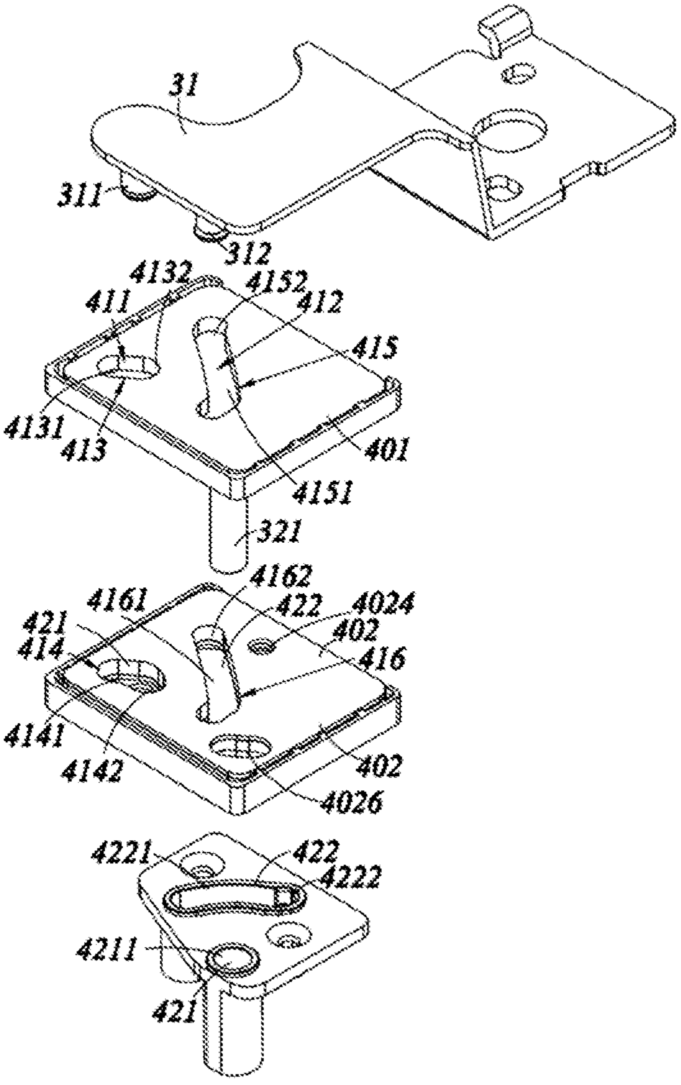

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

First Embodiment

FIG. 1 is a schematic diagram of a refrigerator 100 according to the first embodiment of the present invention.

The refrigerator 100 includes a cabinet 10, a door 20 for opening and closing the cabinet 10, and a hinge assembly 30 for connecting the cabinet 10 and the door 20.

FIGS. 2 to 9 are schematic diagrams of the hinge assembly 30 in the first embodiment of the present invention.

It should be emphasized that the hinge assembly 30 in the present embodiment is applicable to not only the refrigerator 100, but also other scenarios, such as a cupboard, a wine cabinet, a wardrobe, or the like, and the present invention is exemplified with the hinge assembly 30 applied to the refrigerator 100, but not limited thereto.

In the present embodiment, the hinge assembly 30 includes a plurality of hinge parts 31, 32 and a switching assembly 40, and the switching assembly 40 controls a switching operation between the plurality of hinge parts 31, 32.

Here, the "switching operation" means that the plurality of hinge parts 31, 32 may alternately operate to control opening and closing processes of the door 20, thus improving a degree of freedom in the opening and closing process of the door 20 of the refrigerator 100.

It should be noted that the switching assembly 40 may realize the switching operation between the hinge parts 31, 32 by means of mechanical control, electrical control, or the like.

In the present embodiment, for example, the hinge assembly 30 includes a first hinge part 31 and a second hinge part 32; it may be understood that in other embodiments, the hinge assembly 30 may include other numbers of hinge parts; for example, the hinge assembly 30 includes three hinge parts, and the switching assembly 40 controls the switching operation between the three hinge parts, which may be determined according to actual situations.

In addition, here, for example, the first hinge part 31 is connected to the cabinet 10, and the second hinge part 32 is connected to the door 20; the first hinge part 31 has one end fixed to the cabinet 10 and the other end extending above the door 20, and the second hinge part 32 is embedded in the door 20.

The switching assembly 40 is connected with the first hinge part 31 and the second hinge part 32; that is, the first hinge part 31 and the switching assembly 40 may interact with each other, and the second hinge part 32 and the switching assembly 40 may interact with each other.

When the hinge assembly 30 is in a first operating state, the first hinge part 31 moves relative to the switching assembly 40, and when the hinge assembly 30 is in a second operating state, the second hinge part 32 moves relative to the switching assembly 40.

That is, the switching assembly 40 may control an operating sequence of the first hinge part 31 and the second hinge part 32 by interacting with the first hinge part 31 and the second hinge part 32.

In the present embodiment, the switching assembly 40 includes a first fitting part 41 and a second fitting part 42; when the hinge assembly 30 is in the first operating state (referring to FIGS. 10 to 14), the first hinge part 31 and the first fitting part 41 move relatively, and the second fitting part 42 limits the second hinge part 32; when the hinge assembly 30 is in a process of switching from the first operating state to the second operating state (referring to FIGS. 15 to 19), the second hinge part 32 is released from the limit of the second fitting part 42, and the first fitting part 41 limits the first hinge part 31; when the hinge assembly 30 is in the second operating state (referring to FIGS. 20 to 24), the second hinge part 32 and the second fitting part 42 move relatively.

In the present embodiment, the first fitting part 41 and the second fitting part 42 are specifically configured as a first switching part 401 and a second switching part 402 which are fitted with each other; that is, the switching assembly 40 includes the first switching part 401 and the second switching part 402 which are fitted with each other, but the present invention is not limited thereto.

When the hinge assembly 30 is in the first operating state or the second operating state, the first switching part 401 and the second switching part 402 are relatively stationary, and when the hinge assembly 30 is in the process of switching from the first operating state to the second operating state, the first switching part 401 moves relative to the second switching part 402, such that the second hinge part 32 is released from the limit of the second fitting part 42, and the first fitting part 41 limits the first hinge part 31.

That is, the switching assembly 40 includes the first switching part 401 and the second switching part 402 which may move relatively, and the first hinge part 31 and the second hinge part 32 may be locked and unlocked by controlling a relative position relationship among the first hinge part 31, the second hinge part 32, the first switching part 401 and the second switching part 402, such that the first hinge part 31 and the second hinge part 32 sequentially operate by the switching assembly 40.

It may be understood that the "first operating state" here means that the first hinge part 31 is in an unlocked state, such that the first hinge part 31 moves relative to the switching assembly 40, and the second hinge part 32 is in a locked state; the "second operating state" means that the second hinge part 32 is in an unlocked state, such that the second hinge part 32 moves relative to the switching assembly 40, and the first hinge part 31 is in a locked state; the "switching from the first operating state to the second operating state" means that by the relative movement of the first switching part 401 and the second switching part 402, the first hinge part 31 is changed from the unlocked state to the locked state, and meanwhile, the second hinge part 32 is changed from the locked state to the unlocked state, such that the first hinge part 31 and the second hinge part 32 operate sequentially.

Here, the first switching part 401 and the second switching part 402 have similar profiles; when the hinge assembly 30 is in the first operating state, the first switching part 401 and the second switching part 402 are overlapped with each other; when the hinge assembly 30 is in the process of switching from the first operating state to the second operating state, the first switching part 401 and the second switching part 402 are staggered by a certain angle; when the hinge assembly 30 is in the second operating state, the first switching part 401 and the second switching part 402 are relatively stationary and maintain the previous staggered state.

In the present embodiment, the hinge assembly 30 is applied to the refrigerator 100; when the door 20 is opened from a closed state to a first opening angle $\alpha 1$, the hinge assembly 30 is in the first operating state, the first hinge part 31 moves relative to the switching assembly 40, and the switching assembly 40 locks the second hinge part 32; when the door 20 is continuously opened from the first opening angle $\alpha 1$ to a second opening angle $\alpha 2$, the hinge assembly 30 is in the process of switching from the first operating state to the second operating state, the switching assembly 40 unlocks the second hinge part 32, and the switching assembly 40 locks the first hinge part 31; when the door 20 is continuously opened from the second opening angle $\alpha 2$ to a maximum opening angle $\alpha 3$, the hinge assembly 30 is in the second operating state, and the second hinge part 32 moves relative to the switching assembly 40.

Specifically, the first hinge part 31 and the first fitting part 41 move relatively by a first shaft set 311, 312 and a first groove set 411, 412 which are fitted with each other, and the second hinge part 32 and the second fitting part 42 move relatively by a second shaft set 321, 322 and a second groove set 421, 422 which are fitted with each other; certainly, other fitting forms may be adopted between the first hinge part 31 and the first fitting part 41, and between the second hinge part 32 and the second fitting part 42.

In the present embodiment, the first shaft set 311, 312 includes a first shaft 311 and a second shaft 312, the first groove set 411, 412 includes a first groove 411 fitted with the first shaft 311 and a second groove 412 fitted with the second shaft 312, the second shaft set 321, 322 includes a third shaft 321 and a fourth shaft 322, and the second groove set 421, 422 includes a third groove 421 fitted with the third shaft 321 and a fourth groove 422 fitted with the fourth shaft 322.

Here, the first shaft 311 is located at one of the first hinge part 31 and the first fitting part 41, and the first groove 411 is located at the other of the first hinge part 31 and the first fitting part 41.

The second shaft 312 is located at one of the first hinge part 31 and the first fitting part 41, and the second groove 412 is located at the other of the first hinge part 31 and the first fitting part 41.

The third shaft 321 is located at one of the second hinge part 32 and the second fitting part 42, and the third groove 421 is located at the other of the second hinge part 32 and the second fitting part 42.

The fourth shaft 322 is located at one of the second hinge part 32 and the second fitting part 42, and the fourth groove 422 is located at the other of the second hinge part 32 and the second fitting part 42.

That is, the hinge assembly 30 may be distributed in various ways; for example, the first hinge part 31 includes the first shaft 311 and the second shaft 312, the first fitting part 41 includes the first groove 411 and the second groove 412, the second fitting part 42 includes the third groove 421 and the fourth groove 422, and the second hinge part 32 includes the third shaft 321 and the fourth shaft 322; or the first hinge part 31 includes the first shaft 311 and the second groove 412, the first fitting part 41 includes the first groove 411 and the second shaft 312, the second hinge part 32 includes the third shaft 321 and the fourth groove 422, and the second fitting part 42 includes the third groove 421 and the fourth shaft 421; the specific distribution may be determined according to actual situations.

Here, for example, the first hinge part 31 includes the first shaft 311 and the second shaft 312, the first fitting part 41 includes the first groove 411 and the second groove 412, the second fitting part 42 includes the third shaft 321 and the fourth shaft 322, and the second hinge part 32 includes the third groove 421 and the fourth groove 422.

It may be seen that in the present embodiment, the first hinge part 31 is fitted with the first fitting part 41 by double shafts and double grooves, and the second hinge part 32 is fitted with the second fitting part 42 by double shafts and double grooves, but the present invention is not limited thereto.

In other embodiments, a single-shaft single-groove fitting form may be included; for example, the first shaft set includes the first shaft, the first groove set includes the first groove fitted with the first shaft, and/or the second shaft set includes the third shaft, and the second groove set includes the third groove fitted with the third shaft.

Certainly, a single-shaft single-groove fitting form may be adopted between the first hinge part 31 and the first fitting part 41, and a double-shaft double-groove fitting form may be adopted between the second hinge part 32 and the second fitting part 42; or a double-shaft double-groove fitting form may be adopted between the first hinge part 31 and the first fitting part 41, and a single-shaft single-groove fitting form may be adopted between the second hinge part 32 and the second fitting part 42; or the fitting operation may be realized by other numbers of shafts and other numbers of grooves.

In the present embodiment, with continued reference to FIGS. 2 to 9, for example, the first fitting part 41 and the second fitting part 42 are specifically configured as the first switching part 401 and the second switching part 402 which are fitted with each other for description.

The first groove 411 includes a first upper groove 413 located at the first switching part 401 and a first lower groove 414 located at the second switching part 402, the first upper groove 413 includes a first upper free section 4131, and the first lower groove 414 includes a first lower free section 4141.

The second groove 412 includes a second upper groove 415 located at the first switching part 401 and a second lower groove 416 located at the second switching part 402, the second upper groove 415 includes a second upper free section 4151, and the second lower groove 416 includes a second lower free section 4161.

The third groove 421 includes a third free section 4211.

The fourth groove 422 includes a fourth free section 4221.

The first groove set 411, 412 includes locking sections 4132, 4142, 4152, 4162, and the second groove set 421, 422 includes a limiting section 4222.

The locking sections 4132, 4142, 4152, 4162 include a first upper locking section 4132 located at the first upper groove 413, a first lower locking section 4142 located at the first lower groove 414, a second upper locking section 4152 located at the second upper groove 415, and a second lower locking section 4162 located at the second lower groove 416, and the limiting section 4222 includes a fourth limiting section 4222 located at the fourth groove 422.

The first upper locking section 4132 is communicated with the first upper free section 4131, the first lower locking section 4142 is communicated with the second lower free section 4141, the second upper locking section 4152 is communicated with the second upper free section 4151, and the second lower locking section 4162 is communicated with the second lower free section 4161.

The first upper locking section 4132 and the first lower locking section 4142 are always staggered, and the second upper locking section 4152 and the second lower locking section 4162 are always staggered.

Here, the "always staggered" means that the first upper locking section 4132 and the first lower locking section 4142 are not completely overlapped and the second upper locking section 4152 and the second lower locking section 4162 are not completely overlapped in the opening process of the door 20.

Certainly, the arrangement positions, the number, or the like, of the locking sections 4132, 4142, 4152, 4162 and the limiting section 4222 are not limited to the above description; for example, the third groove 421 may also include the limiting section 4222, or the first upper groove 413 and the first lower groove 414 may not include the locking sections.

In the present embodiment, the first switching part 401 is closer to the first hinge part 31 than the second switching part 402; that is, the first hinge part 31, the first switching part 401, the second switching part 402 and the second hinge part 32 are stacked in sequence.

Figure 5:
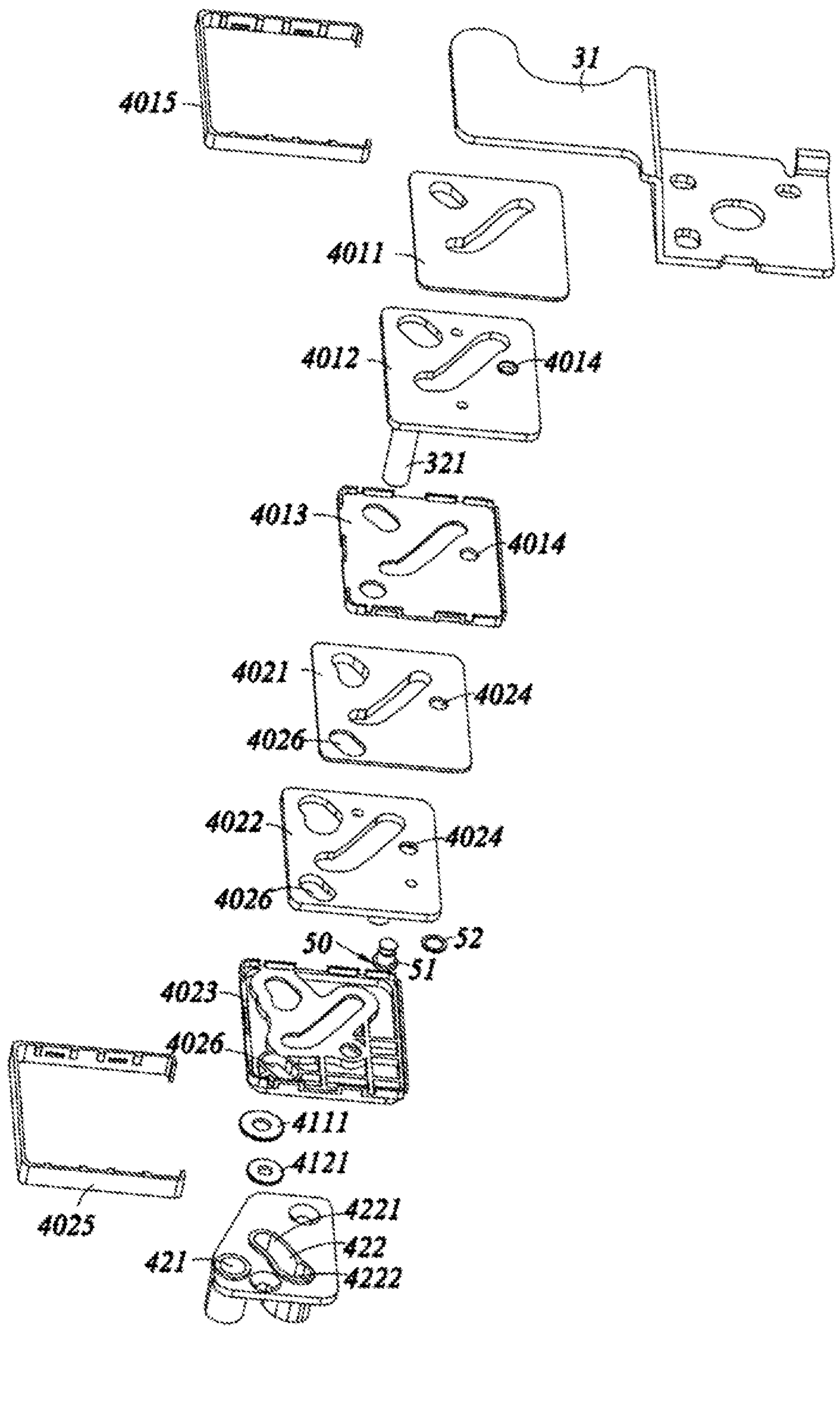
Figure 6:
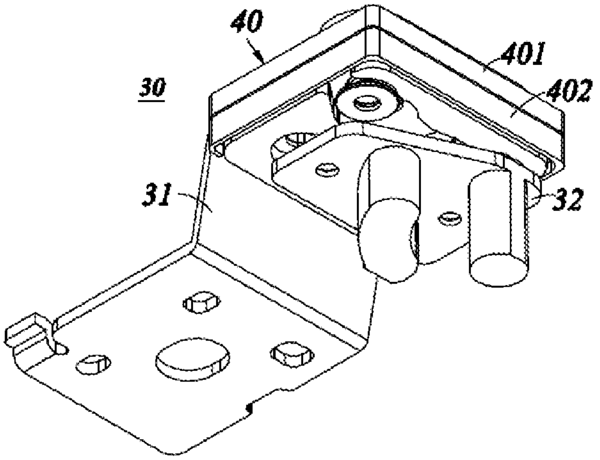
FIG. 6 is a perspective view of the hinge assembly in the first to fourth embodiments of the present invention in the closed state from a second perspective.
Figure 7:
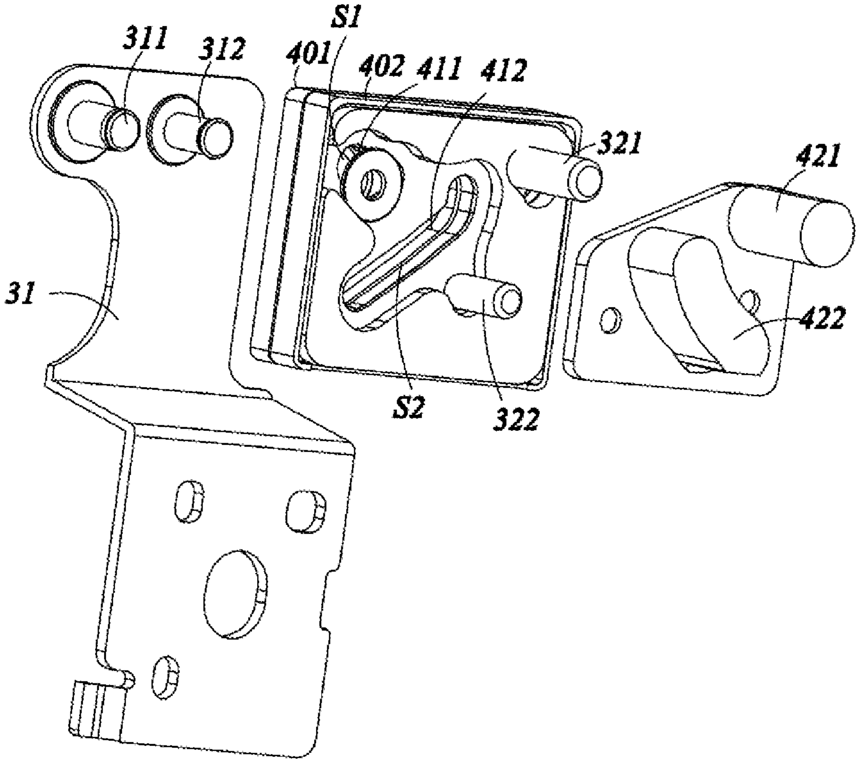
FIGS. 7 to 9 are exploded views of the hinge assembly in the first to fourth embodiments of the present invention in different states from the second perspective.
Figure 8:
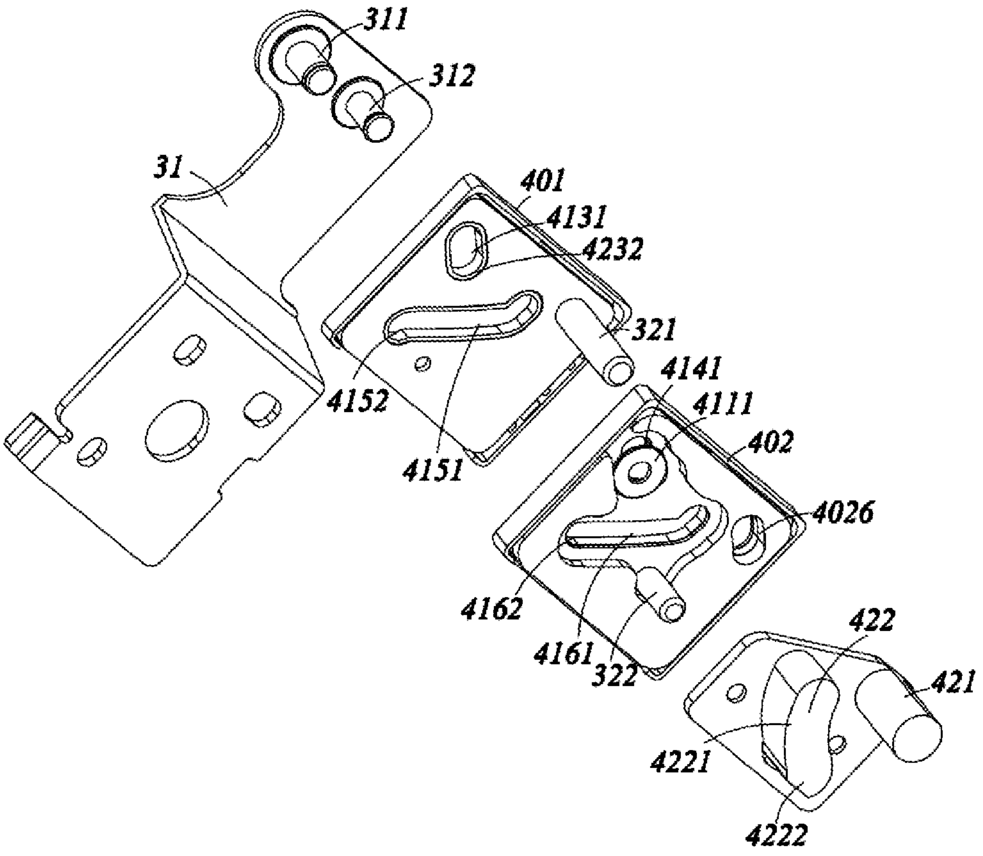
Figure 9:
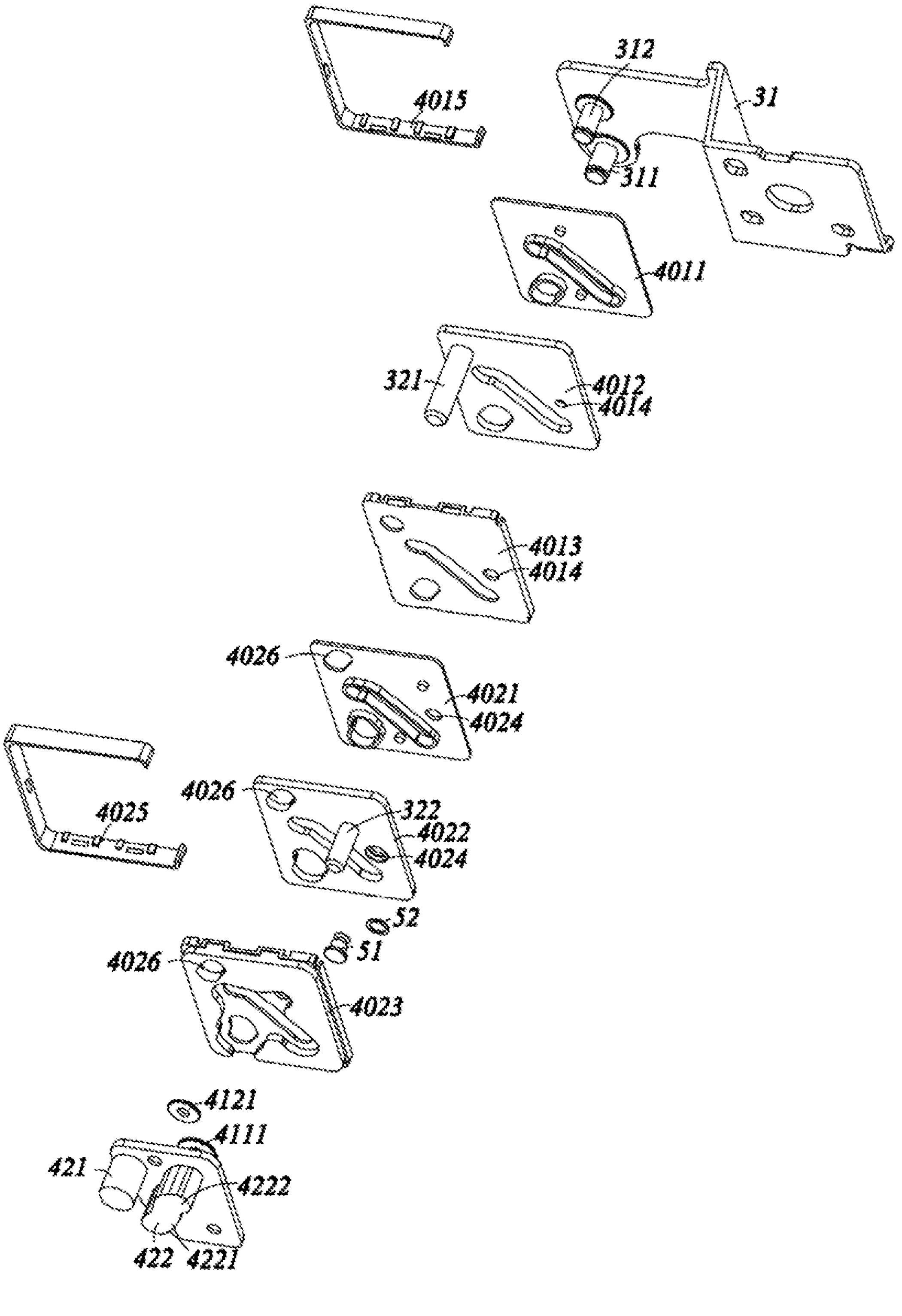
Figure 10:
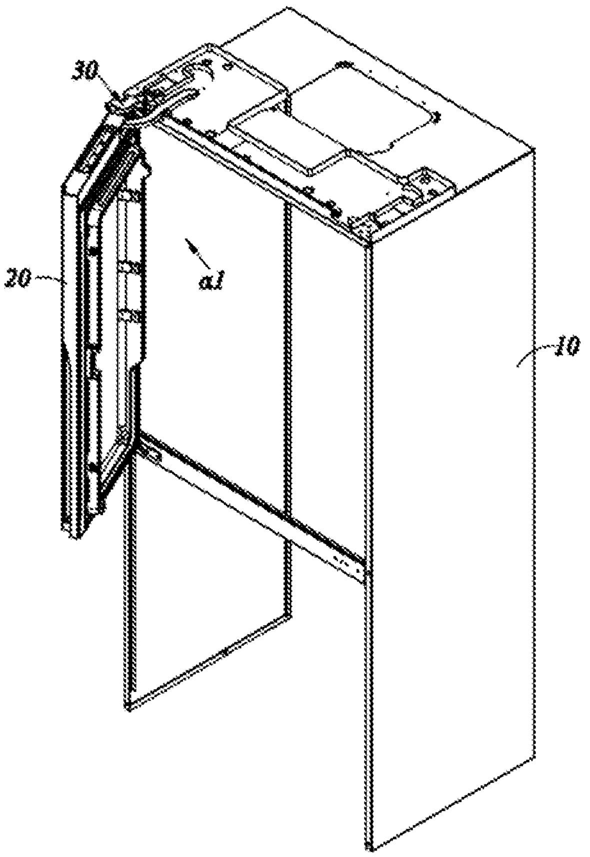
FIG. 10 is a perspective view of the refrigerator according to the first to fourth embodiments of the present invention at a first opening angle.
Figure 11:
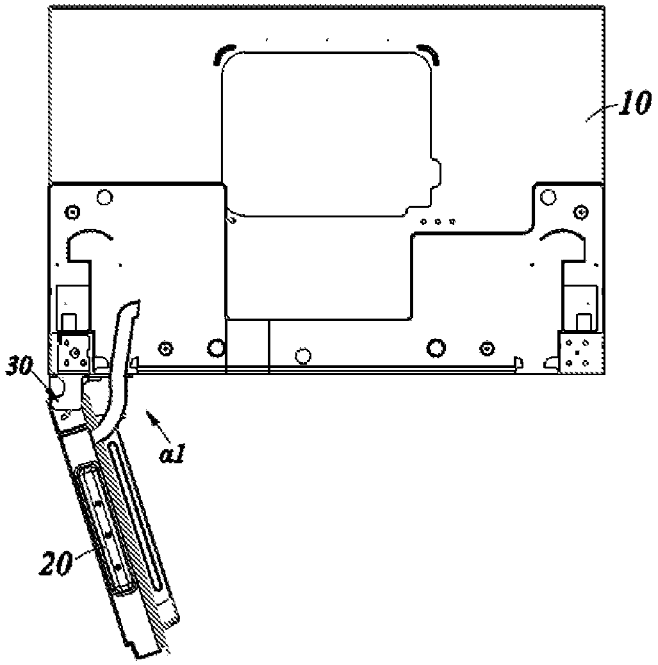
FIG. 11 is a top view of FIG. 10.
Figure 12:
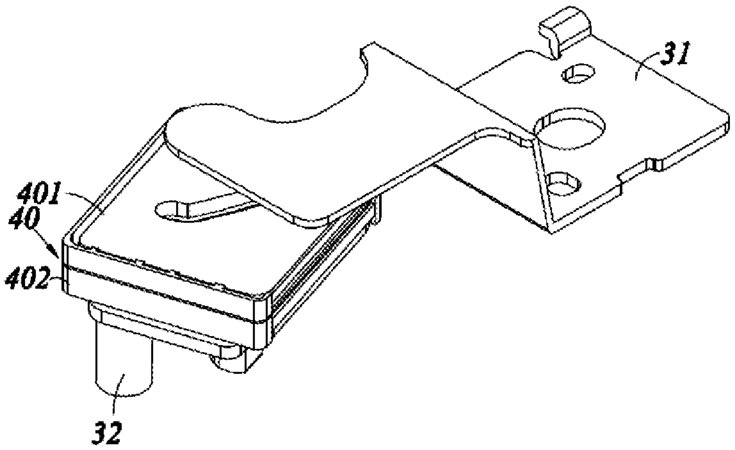
FIG. 12 is a perspective view of the hinge assembly in the first to fourth embodiments of the present invention at the first opening angle.
Figure 13:
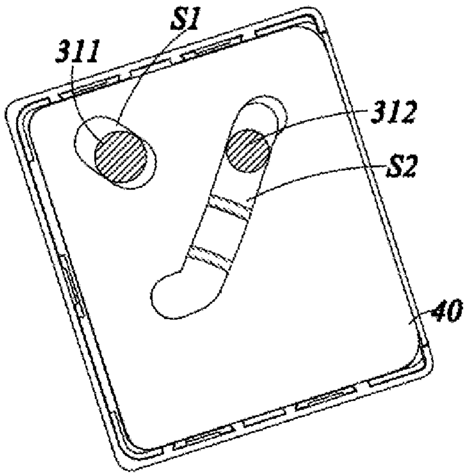
FIG. 13 is a top sectional view of the hinge assembly in the first to fourth embodiments of the present invention at the first opening angle.
Figure 14:
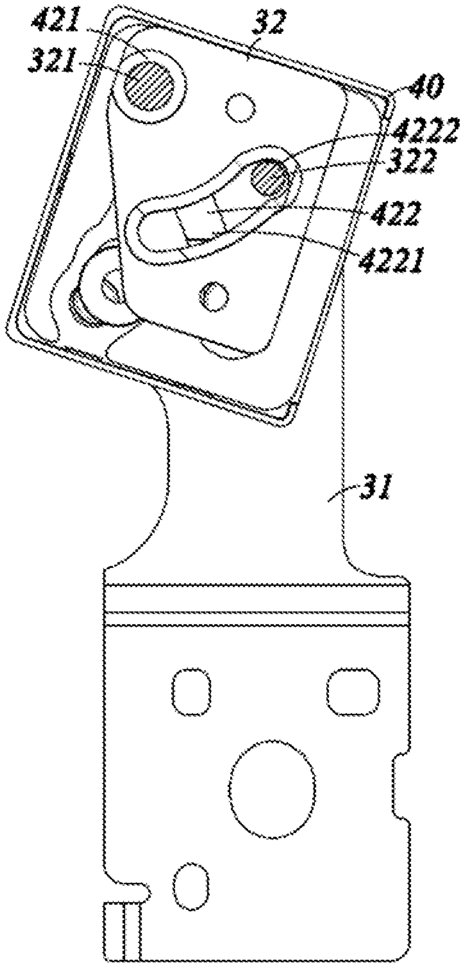
FIG. 14 is a bottom sectional view of the hinge assembly in the first to fourth embodiments of the present invention at the first opening angle.
Figure 15:
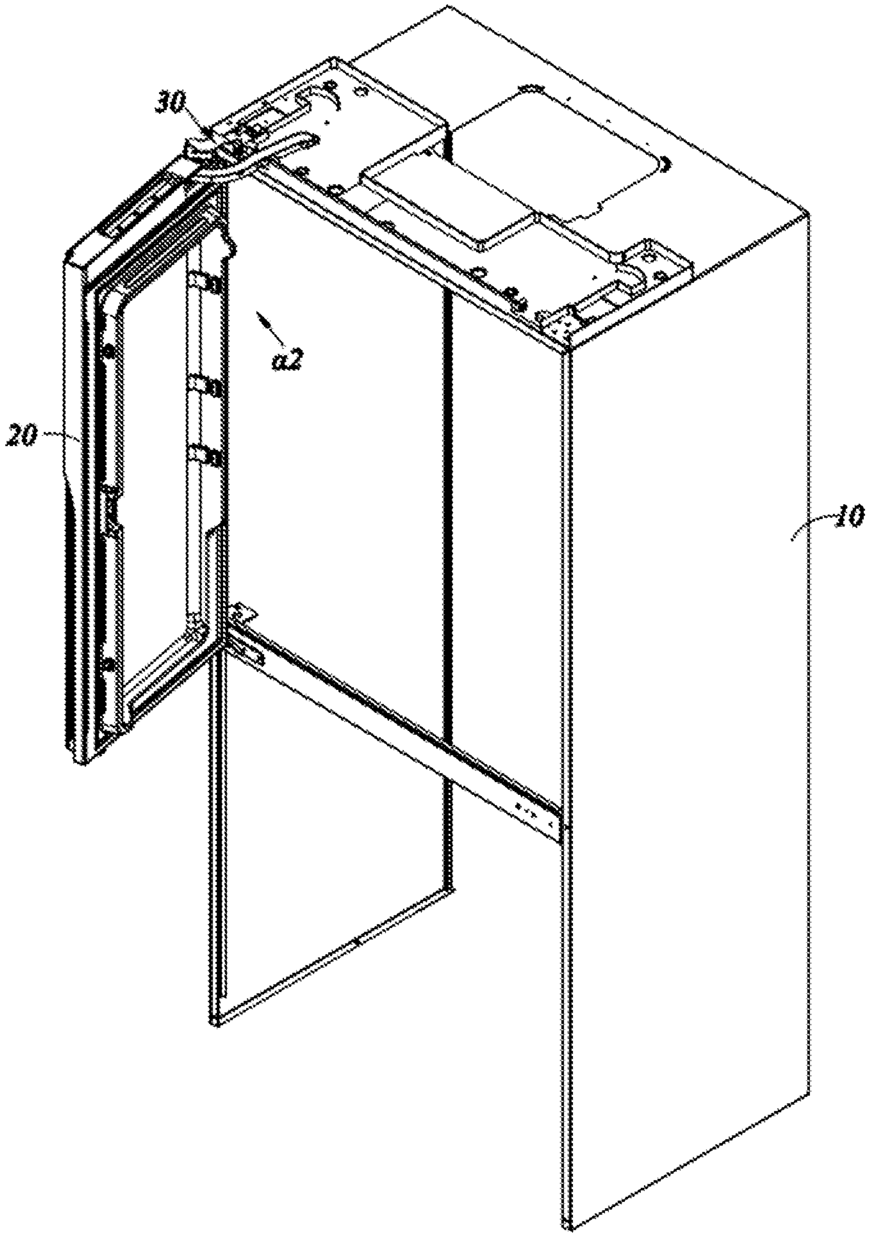
FIG. 15 is a perspective view of the refrigerator according to the first to fourth embodiments of the present invention at a second opening angle.
Figure 16:
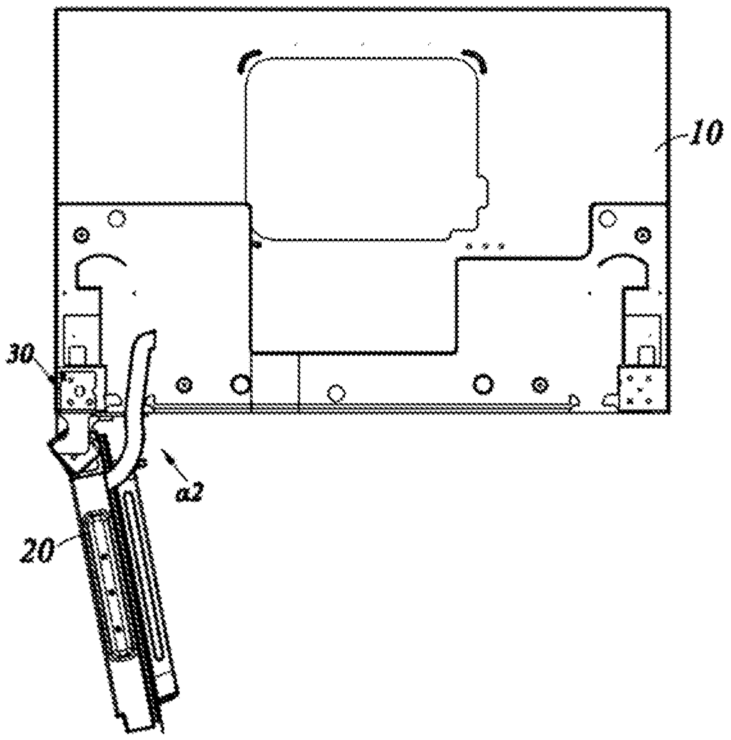
FIG. 16 is a top view of FIG. 15.
Figure 17:
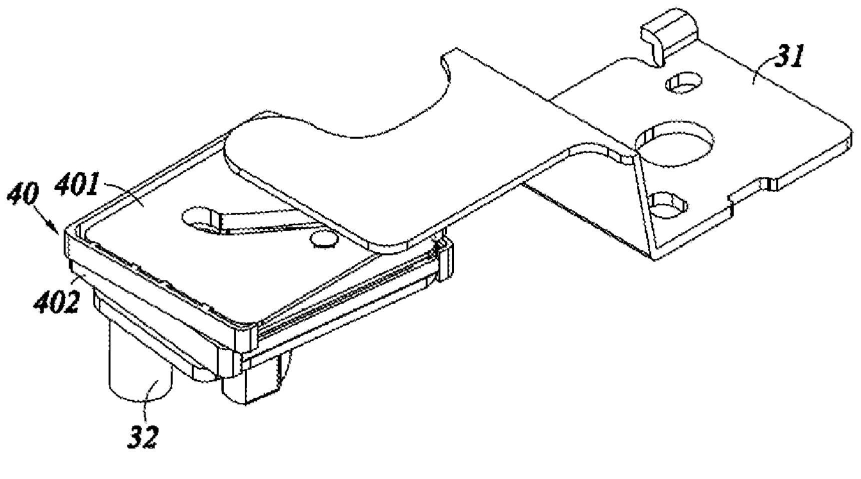
FIG. 17 is a perspective view of the hinge assembly in the first to fourth embodiments of the present invention at the second opening angle.
Figure 18:
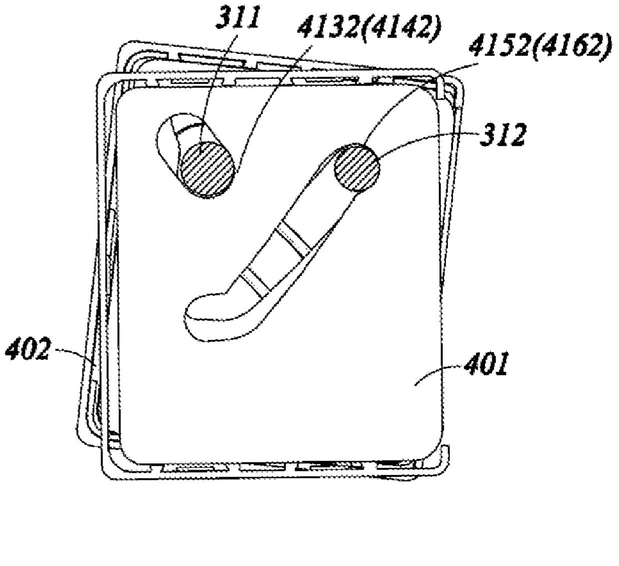
FIG. 18 is a top sectional view of the hinge assembly in the first to fourth embodiments of the present invention at the second opening angle.
Figure 19:
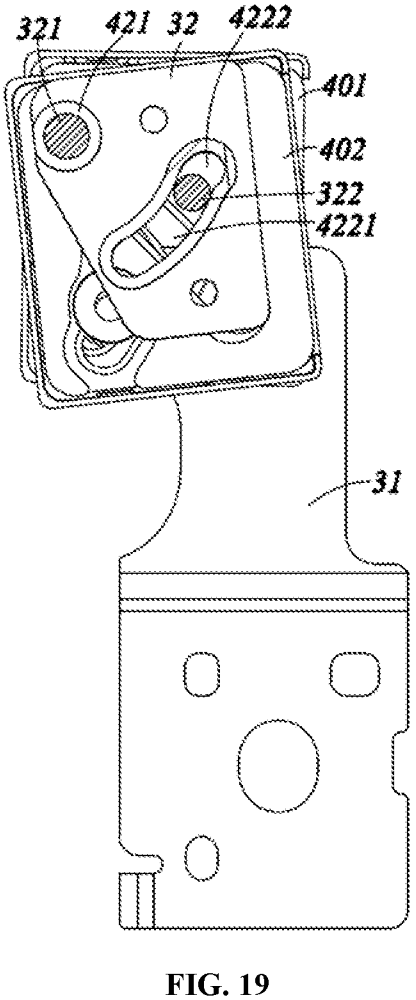
FIG. 19 is a bottom sectional view of the hinge assembly in the first to fourth embodiments of the present invention at the second opening angle.
Figure 20:
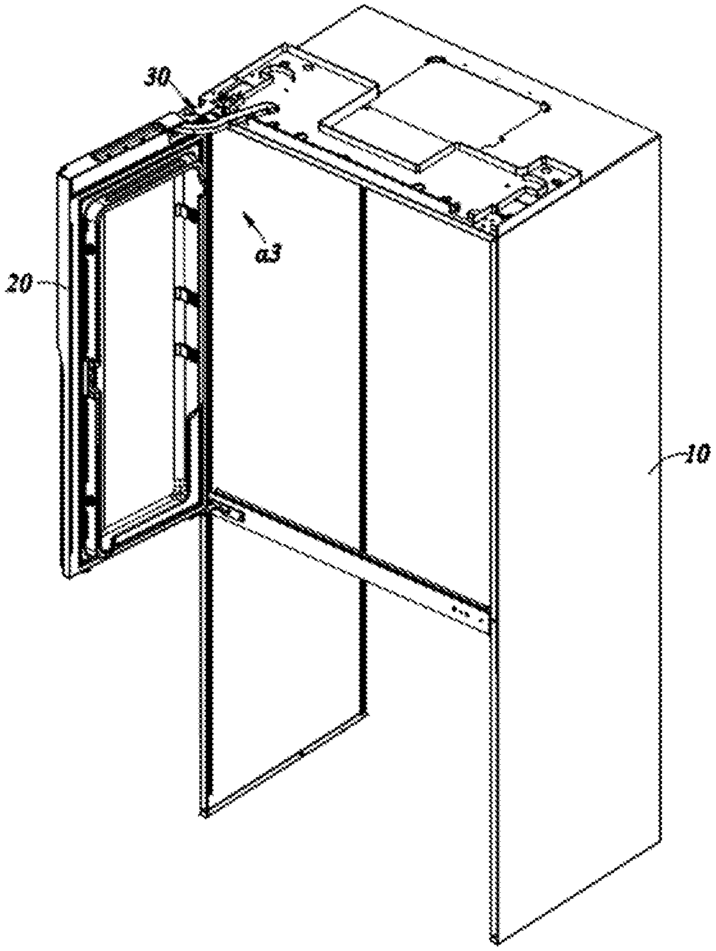
FIG. 20 is a perspective view of the refrigerator according to the first to fourth embodiments of the present invention at a third opening angle.
Figure 21:
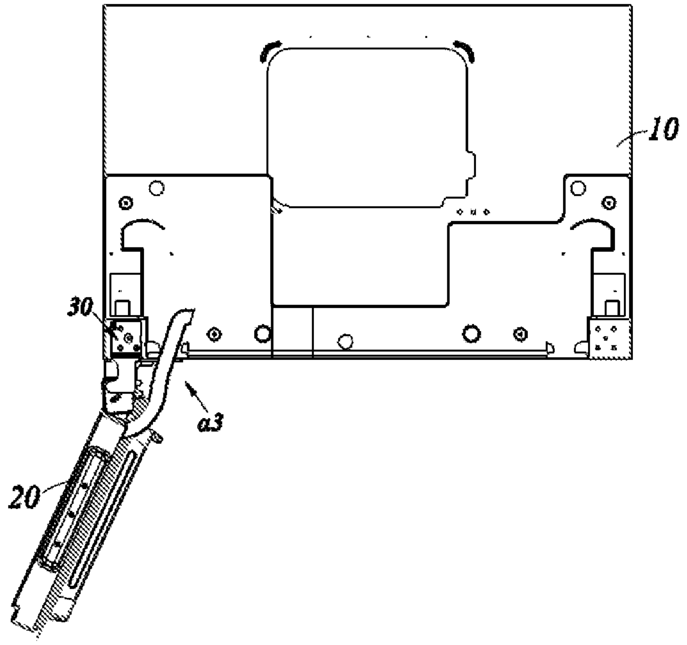
FIG. 21 is a top view of FIG. 20.
Figure 22:
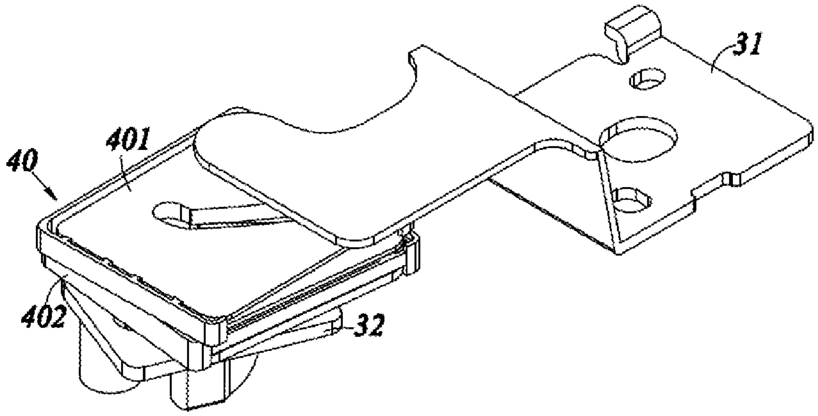
FIG. 22 is a perspective view of the hinge assembly in the first to fourth embodiments of the present invention at the third opening angle.
Figure 23:
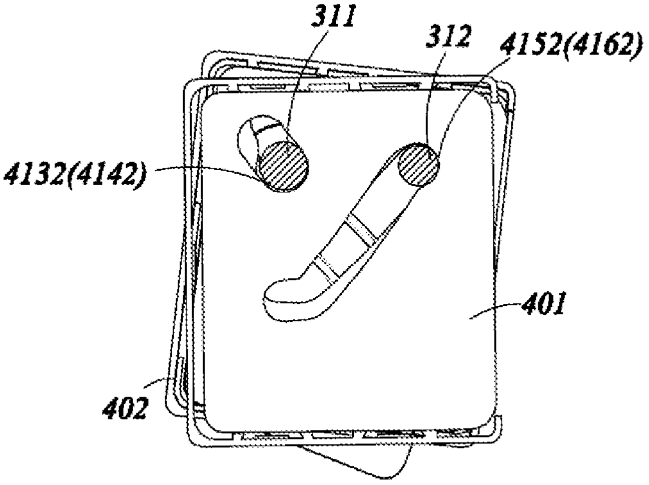
FIG. 23 is a top sectional view of the hinge assembly in the first to fourth embodiments of the present invention at the third opening angle.
Figure 24:
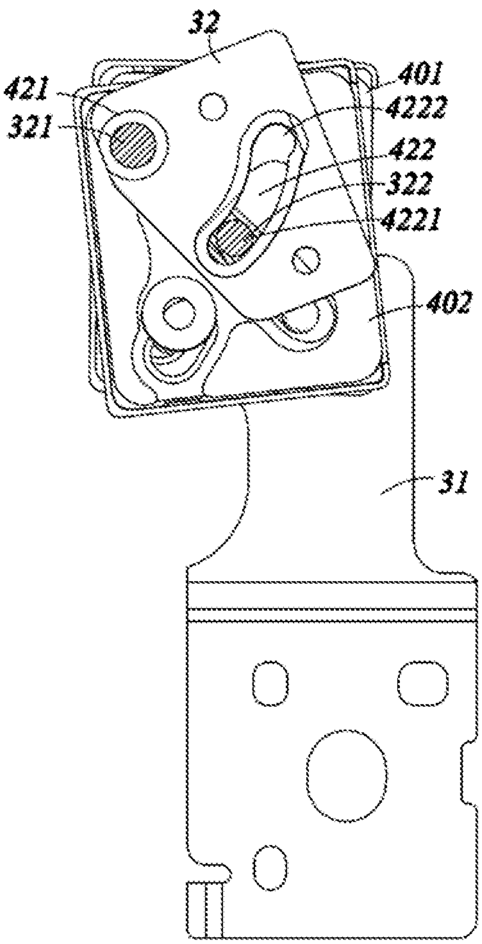
FIG. 24 is a bottom sectional view of the hinge assembly in the first to fourth embodiments of the present invention at the third opening angle.

Referring to FIGS. 5 and 9, the hinge assembly 30 further includes a first riveting sheet 4111 and a second riveting sheet 4121; when the first shaft 311 extends into the first groove 411, the first riveting sheet 4111 is located below the second switching part 402, and the first shaft 311 is sleeved with the first riveting sheet 4111, so as to prevent the first shaft 311 from being separated from the first groove 411; similarly, when the second shaft 312 extends into the second groove 412, the second riveting sheet 4121 is located below the second switching part 402, and the second shaft 312 is sleeved with the second riveting sheet 4121, so as to prevent the second shaft 312 from being separated from the second groove 412.

The first switching part 401 and the second switching part 402 are fitted and connected with each other by a fifth shaft 50.

Here, the first switching part 401 and the second switching part 402 are provided with a first through hole 4014 and a second through hole 4024, and an independent riveting part as the fifth shaft 50 penetrates through the first through hole 4014 and the second through hole 4024.

Specifically, the fifth shaft 50 includes a riveting post 51 and a riveting post gasket 52, the riveting post 51 has a large end located below the second through hole 4024 and a small end sequentially extending into the second through hole 4024 and the first through hole 4014, and the riveting post gasket 52 is located above the first through hole 4014 and fitted with the riveting post 51 to lock the riveting post 51.

In this way, the first switching part 401 and the second switching part 402 may be fitted and connected with each other; that is, the first switching part 401 and the second switching part 402 may move relative to each other, and the first switching part 401 and the second switching part 402 may not be separated from each other.

It should be noted that the first through hole 4014 and the second through hole 4024 are matched with the fifth shaft 50, and the first switching part 401 rotates in situ relative to the second switching part 402.

In other embodiments, the through hole may be provided in one of the first switching part 401 and the second switching part 402, and the fifth shaft 50 may be provided at the other of the first switching part 401 and the second switching part 402, such that the first switching part 401 and the second switching part 402 are fitted and connected with each other by fitting the fifth shaft 50 with the through hole, but the invention is not limited thereto.

In addition, the first switching part 401 includes the third shaft 321, the second switching part 402 has a through hole 4026, the third shaft 321 extends to the third groove 421 through the through hole 4026, the second switching part 402 includes the fourth shaft 322, and the fourth shaft 322 extends to the fourth groove 422.

Here, the through hole 4026 may have a greater size than the third shaft 321, such that the third shaft 321 may move in the through hole 4026, and when the first switching part 401 and the second switching part 402 move relatively, the through hole 4026 and the third shaft 321 may be prevented from interfering with each other.

That is, in the present embodiment, the third shaft 321 and the fourth shaft 322 are located at different switching parts, but the invention is not limited thereto.

In the present embodiment, referring to FIGS. 5 and 9, the first switching part 401 includes a first lining 4011, a first sliding sheet 4012, and a first bushing 4013 which are stacked in sequence, and the second switching part 402 includes a second lining 4021, a second sliding sheet 4022, and a second bushing 4023 which are stacked in sequence.

Here, the first hinge part 31, the first lining 4011, the first sliding sheet 4012, the first bushing 4013, the second lining 4021, the second sliding sheet 4022, the second bushing 4023, and the second hinge part 32 are stacked in sequence from top to bottom.

The first lining 4011, the first bushing 4013, the second lining 4021 and the second bushing 4023 are made of plastic, such as polyformaldehyde (POM), or the like.

The first sliding sheet 4012 and the second sliding sheet 4022 are made of metal, such as stainless steel, Q235 steel, or the like.

The first lining 4011, the first sliding sheet 4012 and the first bushing 4013 have matched profiles, and the first lining 4011 and the first bushing 4013 are fitted with each other to sandwich the first sliding sheet 4012 therebetween; the first lining 4011, the first sliding sheet 4012 and the first bushing 4013 are all required to be provided with slots to form the first upper groove 413, the second upper groove 415 and the first through hole 4014 in cooperation.

Here, the slots may be formed only in the first sliding sheet 4012 and the first bushing 4013 to form the first through hole 4014; that is, the first through hole 4014 does not penetrate through the first lining 4011, and at this point, the fifth shaft 50 extends from a position below the first switching part 401 into the first through hole 4011, and the first lining 4011 may shield the first through hole 4014 and the fifth shaft 50, thereby improving attractiveness.

The second lining 4021, the second sliding sheet 4022 and the second bushing 4023 have matched profiles, and the second lining 4021 and the second bushing 4023 are fitted with each other to sandwich the second sliding sheet 4022 therebetween; the second lining 4021, the second sliding sheet 4022 and the second bushing 4023 are all required to be provided with slots to form the first lower groove 414, the second lower groove 416 and the second through hole 4024 in cooperation.

Here, the slots may be formed only in the second lining 4021 and the second sliding sheet 4022 to form the second through hole 4024; that is, the second through hole 4024 does not penetrate through the second bushing 4023, and at this point, the fifth shaft 50 extends from a position below the second bushing 4023 into the second through hole 4024 and the first through hole 4011, and the second bushing 4023 may shield the second through hole 4024 and the fifth shaft 50, thereby improving the attractiveness.

At this point, one end of the riveting post 51 of the fifth shaft 50 may be limited in the second bushing 4023, so as to further improve a fitting effect of the second lining 4021, the second sliding sheet 4022 and the second bushing 4023.

In the present embodiment, the first switching part 401 further includes a first decorative sheet 4015 covering peripheries of the first lining 4011, the first sliding sheet 4012, and the first bushing 4013, the second switching part 402 further includes a second decorative sheet 4025 covering peripheries of the second lining 4021, the second sliding sheet 4022, and the second bushing 4023, and the first decorative sheet 4015 and the second decorative sheet 4025 are separated from each other.

Here, "the first decorative sheet 4015 and the second decorative sheet 4025 are separated from each other" means that the first decorative sheet 4015 and the second decorative sheet 4025 have independent structures, and when the first switching part 401 and the second switching part 402 move relatively, the first decorative sheet 4015 and the second decorative sheet 4025 also move relatively.

In addition, in the present embodiment, the first decorative sheet 4015 is in an n shape; that is, the first decorative sheet 4015 covers only three side surfaces of the first switching part 401, so as to assemble the first decorative sheet 4015; the three side surfaces may be provided with snap structures to be fitted with the first decorative sheet 4015, and in a stacking direction of the first switching part 401 and the second switching part 402, a width of the first decorative sheet 4015 is substantially equal to a sum of thicknesses of the first lining 4011, the first sliding sheet 4012, and the first bushing 4013.

Similarly, the second decorative sheet 4025 is in an n shape; that is, the second decorative sheet 4025 covers only three side surfaces of the second switching part 402, so as to assemble the second decorative sheet 4025; the three side surfaces may be provided with snap structures to be fitted with the second decorative sheet 4025, and in the stacking direction of the first switching part 401 and the second switching part 402, a width of the second decorative sheet 4025 is substantially equal to a sum of thicknesses of the second lining 4021, the second sliding sheet 4022, and the second bushing 4023.

The first decorative sheet 4015 and the second decorative sheet 4025 may be made of Acrylonitrile Butadiene Styrene (ABS) plastic.

Next, a specific operation flow of the hinge assembly 30 will be described.

Referring to FIGS. 10 to 14, when the hinge assembly 30 is in the first operating state, that is, when the door 20 is opened from the closed state to the first opening angle α1, the first switching part 401 and the second switching part 402 are relatively stationary, the first upper free section 4131 and the first lower free section 4141 are overlapped to form a first free section S1, the second upper free section 4151 and the second lower free section 4161 are overlapped to form a second free section S2, the first shaft 311 moves at the first free section S1, the second shaft 312 moves at the second free section S2, and the third shaft 321 and/or the fourth shaft 322 are/is limited at the limiting section 4222, such that the switching assembly 40 limits the second hinge part 32.

Here, "the third shaft 321 and/or the fourth shaft 322 are/is limited at the limiting section 4222" means that the third shaft 321 is limited at the limiting section 4222 (that is, the limiting section 4222 is located in the third groove 421) and the fourth shaft 322 is not limited, or the third shaft 321 is not limited and the fourth shaft 322 is limited at the limiting section 4222 (that is, the limiting section 4222 is located in the fourth groove 422), or both the third shaft 321 and the fourth shaft 322 are limited at the limiting section 4222 (that is, the limiting section 4222 is simultaneously located in the third groove 421 and the fourth groove 422).

Specifically, the fourth shaft 322 is limited at the fourth limiting section 4222, and the second hinge part 32 is in the locked state.

Here, the first upper free section 4131 and the first lower free section 4141 are always overlapped into the first free section S1, and the second upper free section 4151 and the second lower free section 4161 are always overlapped into the second free section S2; that is, the first switching part 401 and the second switching part 402 have completely same motion tracks, the first shaft 311 moves at the first free section S1, and meanwhile, the second shaft 312 moves at the second free section S2; in this process, the first switching part 401 and the second switching part 402 are never staggered; that is, the first switching part 401 and the second switching part 402 are kept stationary relatively, such that the first upper free section 4131 and the first lower free section 4141 may be prevented from being staggered, and meanwhile, the second upper free section 4151 and the second lower free section 4161 are prevented from being staggered, thus ensuring that the first shaft 311 may move smoothly at the first free section S1, and the second shaft 312 may move smoothly at the second free section S2.

With reference to FIGS. 15 to 19, when the hinge assembly 30 is in the process of switching from the first operating state to the second operating state, that is, when the door 20 is continuously opened from the first opening angle α1 to the second opening angle α2, the first switching part 401 and the second switching part 402 move relatively, such that the second hinge part 32 is released from the limit of the switching assembly 40, and the first shaft 311 and/or the second shaft 312 are/is limited at the locking sections 4132, 4142, 4152, 4162, such that the switching assembly 40 limits the first hinge part 31.

Here, "the first switching part 401 and the second switching part 402 move relatively, such that the second hinge part 32 is released from the limit of the switching assembly 40, and the first shaft 311 and/or the second shaft 312 are/is limited at the locking sections 4132, 4142, 4152, 4162, such that the switching assembly 40 limits the first hinge part 31" means that the switching assembly 40 and the second hinge part 32 move relatively, such that no mutual limit exists between the switching assembly 40 and the second hinge part 32, and the switching assembly 40 and the first hinge part 31 move relatively, such that the switching assembly 40 and the first hinge part 31 are limited by each other In an example, the first shaft 311 is simultaneously limited at the first upper locking section 4132 and the first lower locking section 4142, the second shaft 312 is simultaneously limited at the second upper locking section 4152 and the second lower locking section 4162, and the fourth shaft 322 is separated from the fourth limiting section 4222, which is described as follows.

When the door 20 is opened to the first opening angle α1, the second shaft 312 moves from the second free section S2 to the second lower locking section 4162 and is limited, and at this point, the first shaft 311 and the second shaft 312 may no longer move relative to the first free section S1 and the second free section S2, and at this point, the first shaft 311 is close to the first upper locking section 4132 and the first lower locking section 4142, the second shaft 312 is close to the second upper locking section 4152, and tracks of the first upper locking section 4132 and the second upper locking section 4152 are adapted to moving paths of the first shaft 311 and the second shaft 312.

When the door 20 is continuously opened from the first opening angle α1, the door 20 drives the second hinge part 32 connected to the door 20 to move, the second hinge part 32 applies an acting force to the third shaft 321 and the fourth shaft 322 through the third free section 4211 and the fourth limiting section 4222, and then, the third shaft 321 and the fourth shaft 322 drive the first switching part 401 and the second switching part 402 to move.

Specifically, at this point, the first shaft 311 is close to the first upper locking section 4132, and the second shaft 312 is close to the second upper locking section 4152; the first switching part 401 may move by a first angle relative to the first shaft 311 and the second shaft 312 until the first shaft 311 is limited at the first upper locking section 4132, and the second shaft 312 is limited at the second upper locking section 4152; meanwhile, the second switching part 402 moves around the fifth shaft 50 by a second angle relative to the first shaft 311 until the first shaft 311 is limited in the second locking section 4152; in this process, the second shaft 312 always contacts the second lower locking section 4162, and the second angle is greater than the first angle.

That is, the first switching part 401 and the second switching part 402 both rotate by certain angles, and the rotation angle of the second switching part 402 is greater than the rotation angle of the first switching part 401, such that the first switching part 401 and the second switching part 402 also move relatively to be staggered.

It may be understood that the rotation processes of the first switching part 401 and the second switching part 402 are not in a certain sequence, and the first switching part 401 and the second switching part 402 may rotate simultaneously; for example, the first switching part 401 and the second switching part 402 synchronously rotate within a certain rotation angle range, and are then staggered.

In practice, the first switching part 401 and the second switching part 402 drive the first groove 411 and the second groove 412 to rotate relative to the first shaft 311 and the second shaft 312 respectively, and the first shaft 311 is separated from the first free section S1 and abuts against the first upper locking section 4132 and the first lower locking section 4142; that is, the first shaft 311 is simultaneously limited at the first upper locking section 4132 and the first lower locking section 4142; the second shaft 312 is separated from the second free section S2 and abuts against the second upper locking section 4152 and the second lower locking section 4162; that is, the second shaft 312 is simultaneously limited at the second upper locking section 4152 and the second lower locking section 4162; meanwhile, the movement of the second switching part 402 makes the fourth shaft 322 separated from the fourth limiting section 4222.

It may be understood that when the first shaft 311 is located at the first upper locking section 4132 and the first lower locking section 4142, since the first switching part 401 and the second switching part 402 are staggered, the first upper free section 4131 and the first lower free section 4141 which are originally overlapped with each other are also staggered, and at this point, the first upper free section 4131 and the first lower free section 4141 which are staggered restrict the first shaft 311 from being separated from the first upper locking section 4132 and the first lower locking section 4142, thus ensuring that the first shaft 311 is always kept at the first upper locking section 4132 and the first lower locking section 4142 in the process of continuously opening the door 20.

Similarly, when the second shaft 312 is located at the second upper locking section 4152 and the second lower locking section 4162, since the first switching part 401 and the second switching part 402 are staggered, the second upper free section 4151 and the second lower free section 4161 which are originally overlapped with each other are also staggered, and at this point, the second upper free section 4151 and the second lower free section 4161 which are staggered restrict the second shaft 312 from being separated from the second upper locking section 4152 and the second lower locking section 4162, thus ensuring that the second shaft 312 is always kept at the second upper locking section 4152 and the second lower locking section 4162 in the process of continuously opening the door 20.

In addition, the rotation angle of the second switching part 402 is greater than the rotation angle of the first switching part 401; that is, the second switching part 402 and the first switching part 401 are staggered, thus further improving a locking effect between the first hinge part 31 and the switching assembly 40, and ensuring that the first shaft 311 is always kept at the first upper locking section 4132 and the first lower locking section 4142, and the second shaft 312 is always kept at the second upper locking section 4152 and the second lower locking section 4162.

Meanwhile, when the first switching part 401 and the second switching part 402 move relatively, a distance between the third shaft 321 located at the first switching part 401 and the fourth shaft 322 located at the second switching part 402 changes, the third shaft 321 is always located at the third free section 4211, and the fourth shaft 322 moves from the fourth limiting section 4222 to the fourth free section 4221; that is, the fourth shaft 322 is separated from the fourth limiting section 4222.

Referring to FIGS. 20 to 24, when the hinge assembly 30 is in the second operating state, that is, when the door 20 is continuously opened from the second opening angle α2 to the maximum opening angle α3, the third shaft 321 moves at the third free section 4211, and the fourth shaft 322 moves at the fourth free section 4221.

It may be seen that in the present embodiment, by the unlocking and locking effects of the switching assembly 40 on the first hinge part 31 and the second hinge part 32, the first hinge part 31 and the second hinge part 32 may be effectively controlled to be switched sequentially, such that the door 20 may be opened stably.

It may be understood that, when the door 20 is in a closing process, that is, when the door 20 starts to be closed from the maximum opening angle α3, the switching assembly 40 may also effectively control the first hinge part 31 and the second hinge part 32 to be switched sequentially; that is, when the door 20 is closed from the maximum opening angle α3 to the second opening angle α2, the third shaft 321 moves at the third free section 4211, the fourth shaft 322 moves at the fourth free section 4221, and the switching assembly 40 locks the first hinge part 31; when the door 20 is closed from the second opening angle α2 to the first opening angle α1, the first switching part 401 and the second switching part 402 relatively move to make the first hinge part 31 released from the limit of the switching assembly 40, the fourth shaft 322 is limited at the fourth limiting section 4222, and the switching assembly 40 locks the second hinge part 32; when the door 20 is completely closed from the first opening angle α1, the first shaft 311 moves at the first free section S1, and the second shaft 312 moves at the second free section S2.

In other words, the closing process of the door 20 and the opening process of the door 20 are processes in reverse orders, and the switching sequence of the first hinge part 31 and the second hinge part 32 in the opening and closing processes of the door 20 may be effectively controlled by the unlocking and locking effects of the switching assembly 40 on the first hinge part 31 and the second hinge part 32.

In addition, in the present embodiment, the first shaft 311 and the third shaft 321 are staggered, and thus, the refrigerator may be suitable for an embedded cupboard or a scenario with a small space for accommodating the refrigerator 100.

Figure 25:
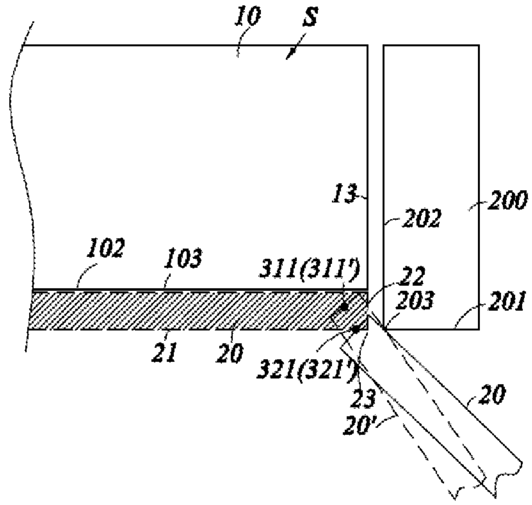
FIG. 25 is a schematic diagram of the refrigerator according to the first to fourth embodiments of the present invention in a fully embedded state.

Referring to FIG. 25, a simple schematic diagram in which the refrigerator 100 is embedded in a cupboard 200 is taken as an example for illustration.

In the present embodiment, the cabinet 10 includes an opening 102 and a front end surface 103 provided around the opening 102; the cabinet 10 further includes an accommodating chamber S and an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22.

Here, when the door 20 is opened to the first opening angle α1 from the closed state, the door 20 rotates around the first shaft 311, and a first distance exists between the first shaft 311 and the front end surface 103; when the door 20 is continuously opened from the second opening angle α2 to the maximum opening angle α3, the door 20 rotates around the third shaft 321, a second distance exists between the third shaft 321 and the front end surface 103, and the second distance is greater than the first distance, thus greatly increasing the maximum opening angle of the fully-embedded refrigerator 100.

In addition, a third distance exists between the first shaft 311 and the outer side surface 13, and when the door 20 is continuously opened from the second opening angle α2 to the maximum opening angle α3, a fourth distance exists between the third shaft 321 and the outer side surface 13, and the fourth distance is less than the third distance, thus further increasing the opening degree of the cabinet 10.

Details are as follows.

In some motion tracks of the refrigerator 100, the door 20 may be considered to move sequentially around the first shaft 311 and the third shaft 321.

In the present embodiment, the hinge assembly 30 further includes the second shaft 312 fitted with the first shaft 311 and the fourth shaft 322 fitted with the third shaft 321, and for simplicity of description, the door 20 is simply considered to rotate around the first shaft 311 first, and be then switched to rotate around the third shaft 321 by the switching assembly 40.

In practice, in order to improve an embedding effect, the refrigerator 100 is preferably embedded into the cupboard 200 completely, and the refrigerator 100 is configured as a free-embedded refrigerator; that is, a front end 201 of the cupboard 200 is located on a same plane as the front wall 21 on a side of the door 20 apart from the cabinet 10, or the front wall 21 of the door 20 does not protrude from the front end 201 of the cupboard 200 at all.

In a prior art, all refrigerators are single-shaft refrigerators, and certain distances are required to be kept between a rotating shaft of the refrigerator and a side wall and a front wall of the refrigerator, such that enough spaces may be provided to satisfy foaming or other processes; that is, the rotating shaft of the existing refrigerator is approximately located at the position of the first shaft 311 in FIG. 25; in this case, after the single-shaft refrigerator is embedded into the cupboard 200, since a corner 203 of the cupboard 200 between the front end 201 and an inner wall 202 is provided corresponding to the side edge 23 of the door 20, when the door 20 is opened, the side edge 23 interferes with the door 20 to limit the maximum opening angle of the door 20; in order to ensure that the door 20 is opened normally, a common method in the prior art is to increase a gap between the inner wall 202 of the cupboard 200 and the refrigerator 100, and this gap is required to have a size of approximate 10 cm, which seriously affects the embedding effect and is not favorable for rational utilization of a limited space.

Referring to FIG. 25, a shaded region represents the door 20 in the closed state; when the door 20 is in the opening process, and when the door 20 always rotates around the first shaft 311 (i.e., the prior art), referring to the dotted-line door 20' in FIG. 25, since the first shaft 311 is close to the front end surface 103 (that is, apart from the front end 201 of the cupboard 200), after the door 20' is opened to a certain angle, the corner 203 of the cupboard 200 interferes with the door 20' to limit the maximum opening angle of the door 20'.

In the present embodiment, the third shaft 321 is located at the first switching part 401, and in the opening process of the door 20, the switching assembly 40 moves relative to the first hinge part 31 and the second hinge part 32, such that the third shaft 321 gradually moves away from the front end surface 103; that is, the third shaft 321 gradually moves towards the front end 201 of the cupboard 200; that is, at this point, the whole door 20 moves away from the cabinet 10; referring to the solid-line door 20 in FIG. 25, the interference effect of the corner 203 of the cupboard 200 on the door 20 is reduced greatly, and the corner 203 of the cupboard 200 interferes with the door when the door 20 is opened to a larger angle, thereby greatly increasing the maximum opening angle of the door 20.

That is, in the present embodiment, the door 20 may rotate around the third shaft 321 in a later period under the action of the switching assembly 40, such that the maximum opening angle of the door 20 may be effectively increased on the premise of ensuring that the refrigerator 100 is freely embedded into the cupboard 200, thus facilitating a user to operate the refrigerator 100, and greatly improving user experiences.

Moreover, in the present embodiment, the gap between the inner wall 202 of the cupboard 200 and the refrigerator 100 is not required to be increased, and the refrigerator 100 and the cupboard 200 may be connected seamlessly, thereby greatly improving the embedding effect.

In addition, in the present embodiment, the switching assembly 40 drives the third shaft 321 to gradually move towards the front end 201 of the cupboard 200, and simultaneously drives the third shaft 321 to gradually approach the inner wall 202 of the cupboard 200; that is, when the door 20 rotates around the third shaft 321, the third shaft 321 is closer to the front end 201 and the inner wall 202 of the cupboard 200 than the first shaft 311, so as to increase the maximum opening angle of the door 20, and make the door 20 apart from the cabinet 10 to increase the opening degree of the cabinet 10, thereby facilitating opening and closing operations of racks, drawers, or the like, in the cabinet 10, or facilitating taking and placing operations of articles.

Certainly, the third shaft 321 finally used as the rotating shaft may be located at other positions; for example, when the door 20 rotates around the third shaft 321, the third shaft 321 is closer to the front end 201 of the cupboard 200 than the first shaft 311, and the third shaft 321 is farther away from the inner wall 202 of the cupboard 200 than the first shaft 311, or the like.

It may be understood that the switching assembly 40 controls the switching sequence of the first hinge part 31 and the second hinge part 32 in the opening and closing processes of the door 20, thus effectively preventing the door 20 from interfering with the cupboard 200 in the opening and closing processes.

In addition, it should be noted that the motion track of the door 20 may be effectively controlled by specific designs of the shaft and the groove; in the present embodiment, the cabinet 10 includes a pivoting side P connected to the hinge assembly 30, and when the door 20 is in the opening process, the hinge assembly 30 at least drives the door 20 to move from the pivoting side P towards the accommodating chamber S, so as to prevent the door 20 from interfering with the peripheral cupboard or wall, or the like, in the opening process; for the specific designs of the shaft and the groove, reference may be made to the following example.

In an example, with reference to FIGS. 26 to 37, the first free section S1 includes an initial position A1 and a stop position A2 which are arranged oppositely, and the second free section S2 includes a first section L1, a second section L2, and a third section L3 which are connected in sequence.

Figure 26:
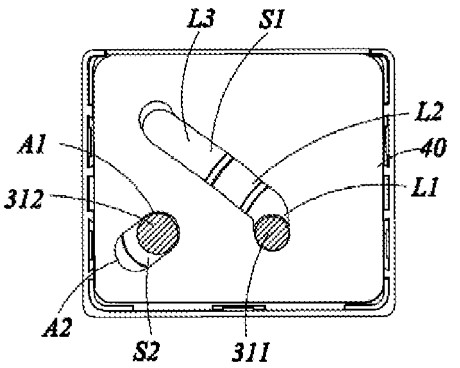
FIG. 26 is a top sectional view of the hinge assembly in an example of the present invention in the closed state.
Figure 27:
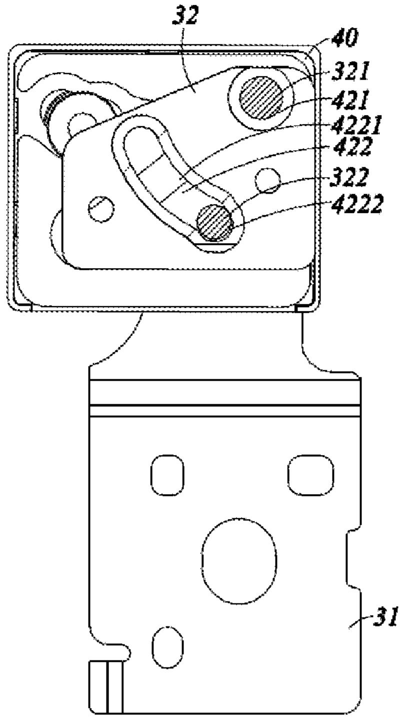
FIG. 27 is a bottom sectional view of the hinge assembly in an example of the present invention in the closed state.

Referring to FIGS. 26 and 27, when the door 20 is in the closed state, the first shaft 311 is located at the initial position A1, the second shaft 312 is located at an end of the first section L1 apart from the second section L2, and the fourth shaft 322 is located at the limiting section 4222, such that the switching assembly 40 limits the second hinge part 32.

Referring to FIGS. 28 to 33, when the door 20 is opened from the closed state to the first opening angle α1, the first shaft 311 rotates in situ at the initial position A1, the second shaft 312 moves in the first section L1 around the first shaft 311, the door 20 rotates in situ relative to the cabinet 10, the second shaft 312 then moves in the second section L2 to drive the first shaft 311 to move from the initial position A1 to the stop position A2, the door 20 moves from the pivoting side P to the accommodating chamber S, the second shaft 312 then moves in the third section L3 to drive the first shaft 311 to move from the stop position A2 to the initial position A1, and the door 20 moves from the accommodating chamber S to the pivoting side P.

Figure 28:
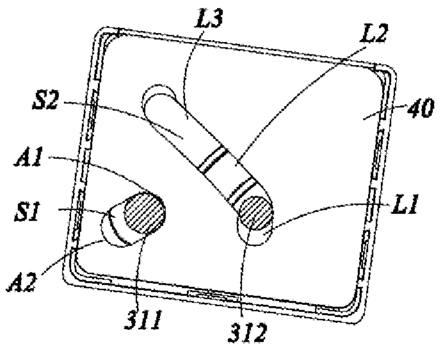
FIG. 28 is a top sectional view of the hinge assembly in an example of the present invention at a first intermediate opening angle.
Figure 29:
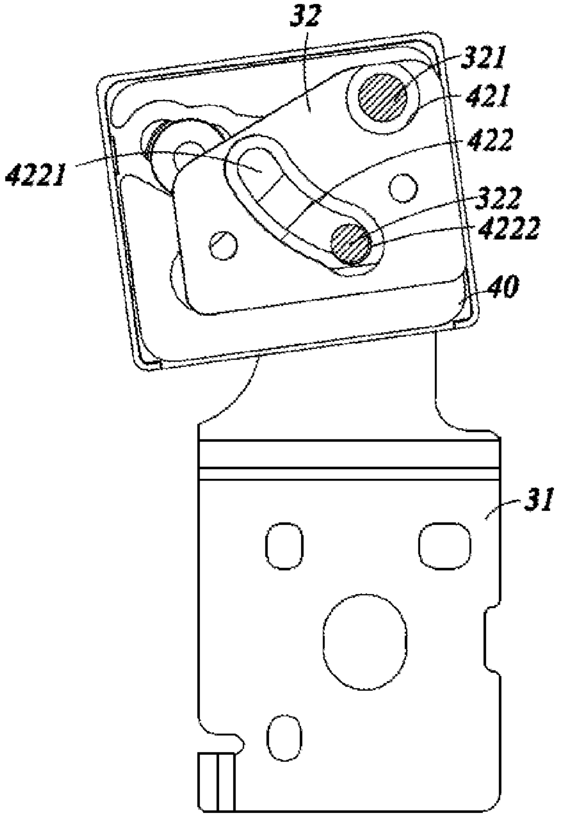
FIG. 29 is a bottom sectional view of the hinge assembly in an example of the present invention at the first intermediate opening angle.

Specifically, referring to FIGS. 28 and 29, when the door 20 is opened from the closed state to a first intermediate opening angle, the first shaft 311 rotates in situ at the initial position A1, the second shaft 312 moves in the first section L1 around the first shaft 311, and the door 20 rotates in situ relative to the cabinet 10.

Here, when opened to the first intermediate opening angle from the closed state, the door 20 rotates in situ relative to the cabinet 10; that is, the door 20 only rotates without generating displacement in other directions, thus effectively avoiding that the door 20 is unable to be normally opened due to displacement in a certain direction of the door 20.

Figure 30:
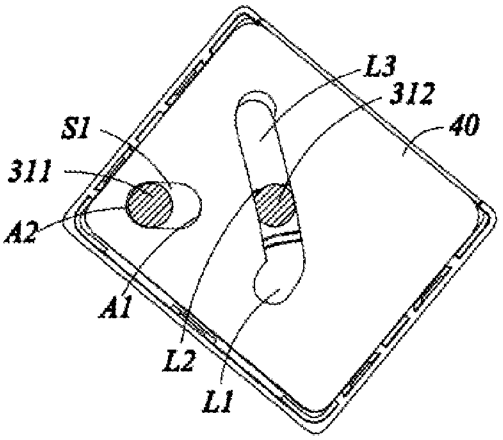
FIG. 30 is a top sectional view of the hinge assembly in an example of the present invention at a second intermediate opening angle.
Figure 31:
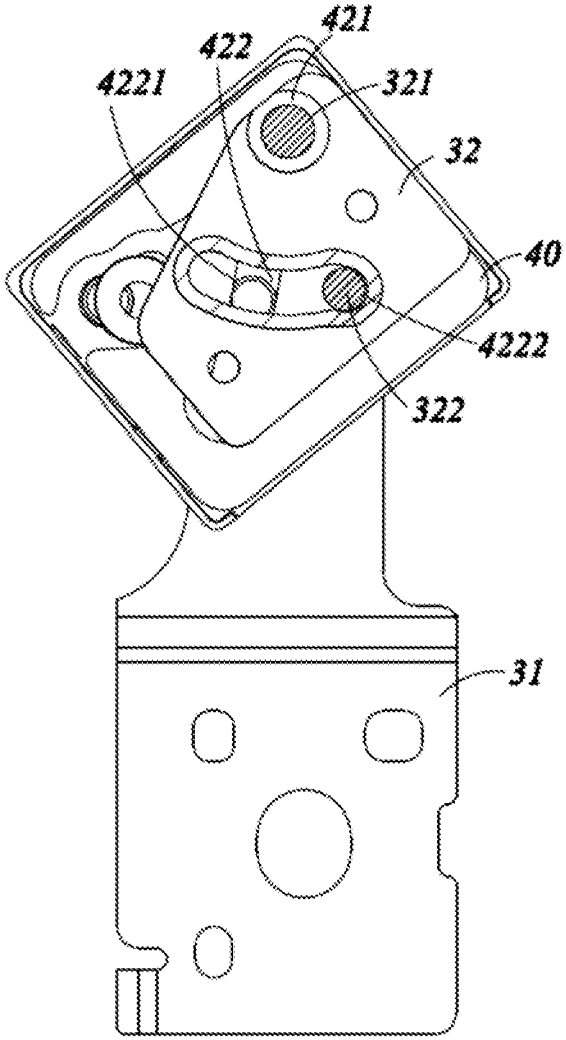
FIG. 31 is a bottom sectional view of the hinge assembly in an example of the present invention at the second intermediate opening angle.

Referring to FIGS. 30 and 31, when the door 20 is opened from the first intermediate opening angle to a second intermediate opening angle, the second shaft 312 moves in the second section L2 to drive the first shaft 311 to move from the initial position A1 to the stop position A2, and the door 20 moves from the pivoting side P towards the accommodating chamber S.

Here, when the door 20 is continuously opened to the second intermediate opening angle from the first intermediate opening angle, the door 20 moves towards a side of the accommodating chamber S; that is, at this point, the door 20 rotates relative to the cabinet 10 and is displaced relative to the cabinet 10 in a first direction X, thus greatly reducing a distance by which the door 20 protrudes out of the cabinet 10 towards a side apart from the accommodating chamber S in the rotation process; that is, the displacement of the door 20 in the first direction X counteracts a part of the door 20 protruding out of the cabinet 10 in a second direction Y in the rotation process, thereby preventing the door 20 from interfering with the peripheral cupboard or wall, or the like, in the opening process; the refrigerator is suitable for the embedded cupboard or the scenario with a small space for accommodating the refrigerator 100.

Here, the first direction X is a direction from the pivoting side P towards the accommodating chamber S, and the second direction Y is a direction from the accommodating chamber S towards the pivoting side P.

Figure 32:
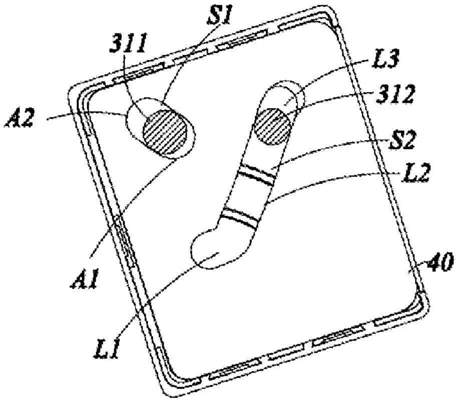
FIG. 32 is a top sectional view of the hinge assembly in an example of the present invention at the first opening angle.
Figure 33:
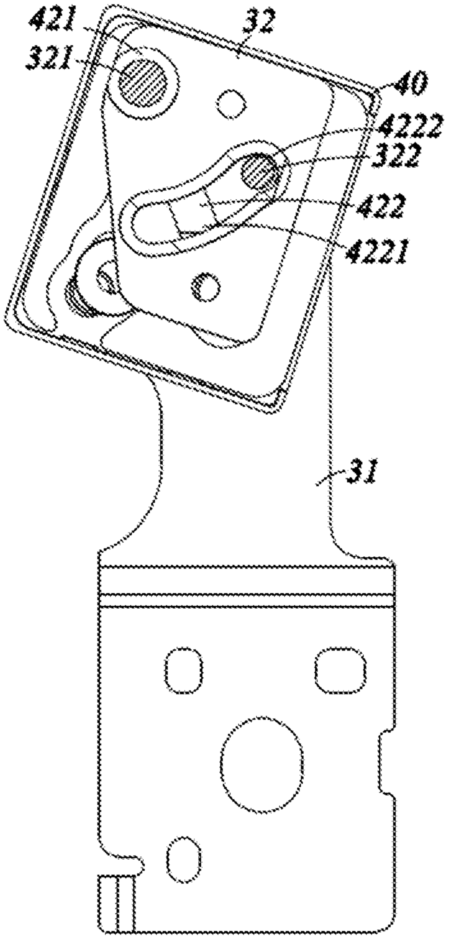
FIG. 33 is a bottom sectional view of the hinge assembly in an example of the present invention at the first opening angle.

Referring to FIGS. 32 and 33, when the door 20 is opened from the second intermediate opening angle to the first opening angle α1, the second shaft 312 moves in the third section L3 to drive the first shaft 311 to move from the stop position A2 to the initial position A1, and the door 20 moves from the accommodating chamber S to the pivoting side P.

Here, when continuously opened to the first opening angle α1 from the second intermediate opening angle, the door 20 moves towards a side of the pivoting side P; that is, at this point, the door 20 rotates relative to the cabinet 10 and is displaced in the second direction Y relative to the cabinet 10, such that the door 20 may be as far away from the cabinet 10 as possible, thus guaranteeing the opening degree of the cabinet 10, and avoiding a problem that the drawers, the racks, or the like, in the cabinet 10 are unable to be opened due to interference of the door 20.

Figure 34:
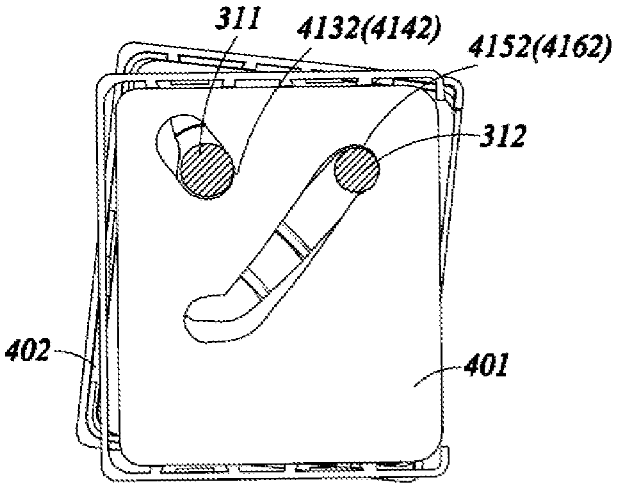
FIG. 34 is a top sectional view of the hinge assembly in an example of the present invention at the second opening angle.
Figure 35:
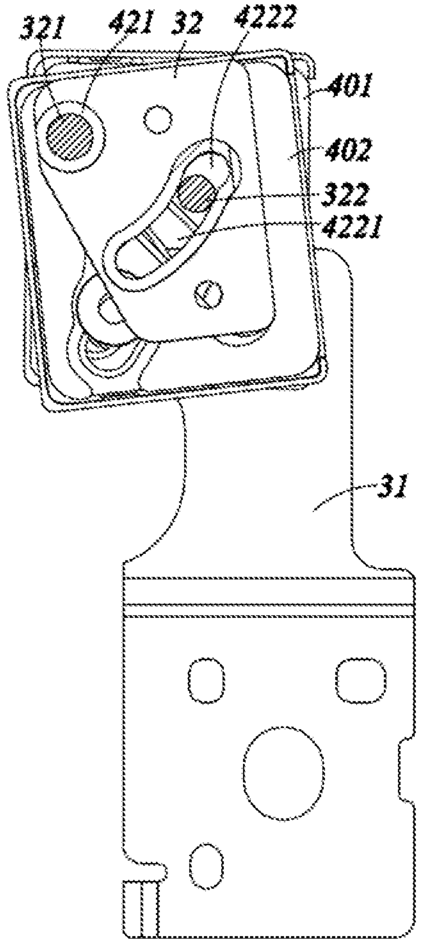
FIG. 35 is a bottom sectional view of the hinge assembly in an example of the present invention at the second opening angle.

Referring to FIGS. 34 and 35, when the door 20 is continuously opened from the first opening angle α1 to the second opening angle α2, the fourth shaft 322 is separated from the limiting section 4222, and the first shaft 311 and/or the second shaft 312 are/is limited at the locking sections 4132, 4142, 4152, 4162, such that the switching assembly 40 limits the first hinge part 31.

Figure 36:
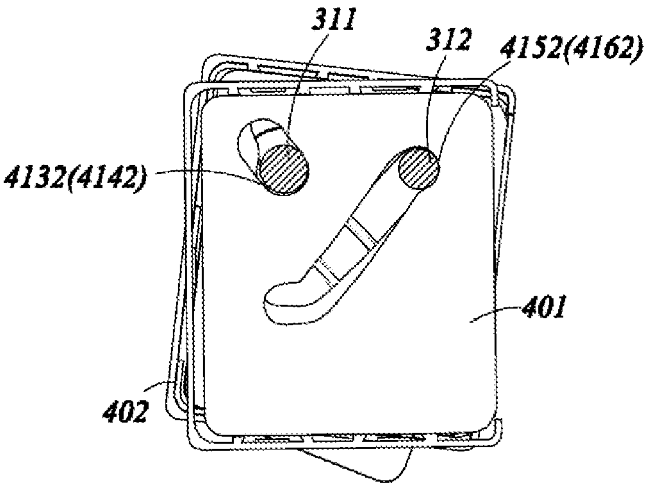
FIG. 36 is a top sectional view of the hinge assembly in an example of the present invention at a maximum opening angle.
Figure 37:
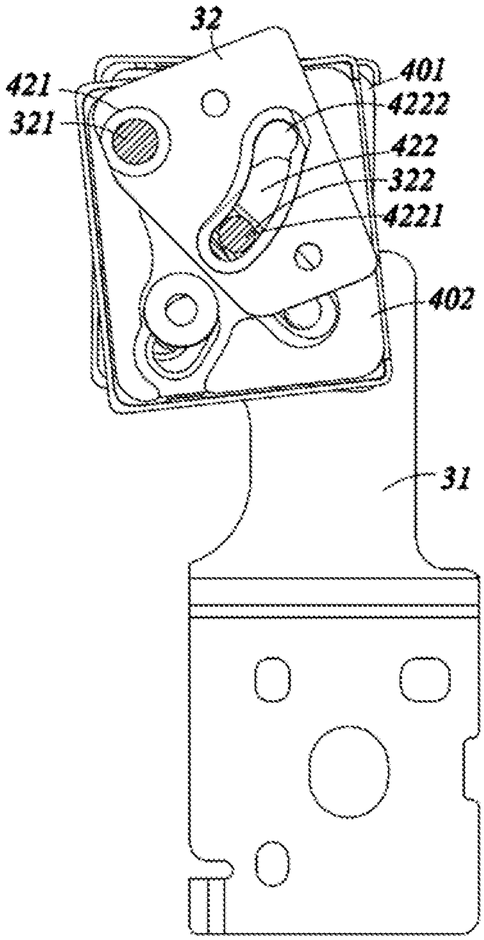
FIG. 37 is a bottom sectional view of the hinge assembly in an example of the present invention at the maximum opening angle.

Referring to FIGS. 36 and 37, when the door 20 is continuously opened from the second opening angle α2 to the maximum opening angle α3, the third shaft 321 rotates in situ in the third free section 421, the fourth shaft 322 moves in the fourth free section 4221 around the third shaft 321, and the door 20 continuously rotates in situ relative to the cabinet 10.

It may be understood that the motion track of the refrigerator 100 is not limited to the above description, and in other examples, other forms of motion may be generated between the first hinge part 31 and the switching assembly 40, or other forms of motion may be generated between the second hinge part 32 and the switching assembly 40, such that the refrigerator may be adapted to various application scenarios, and the specific motion track may be determined according to actual situations.

Figure 38:
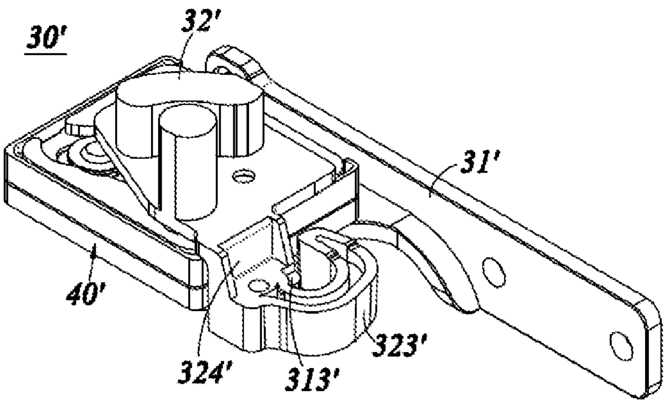
FIG. 38 is a perspective view of the hinge assembly below a door in the first to fourth embodiments of the present invention.
Figure 39:
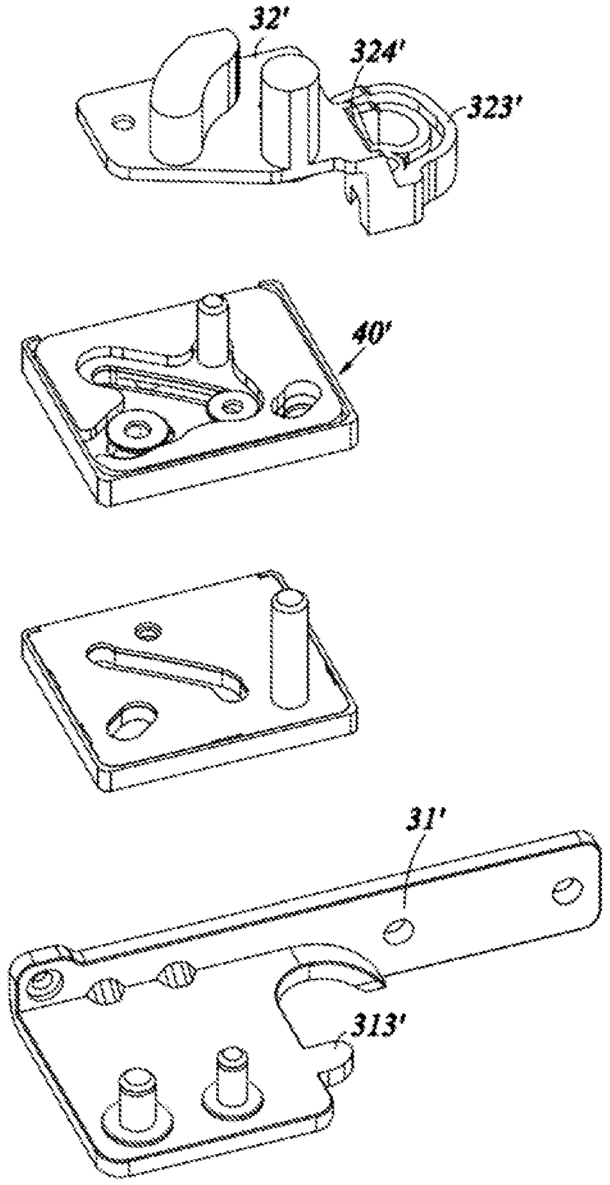
FIG. 39 is an exploded view of the hinge assembly below the door in the first to fourth embodiments of the present invention.
Figure 40:
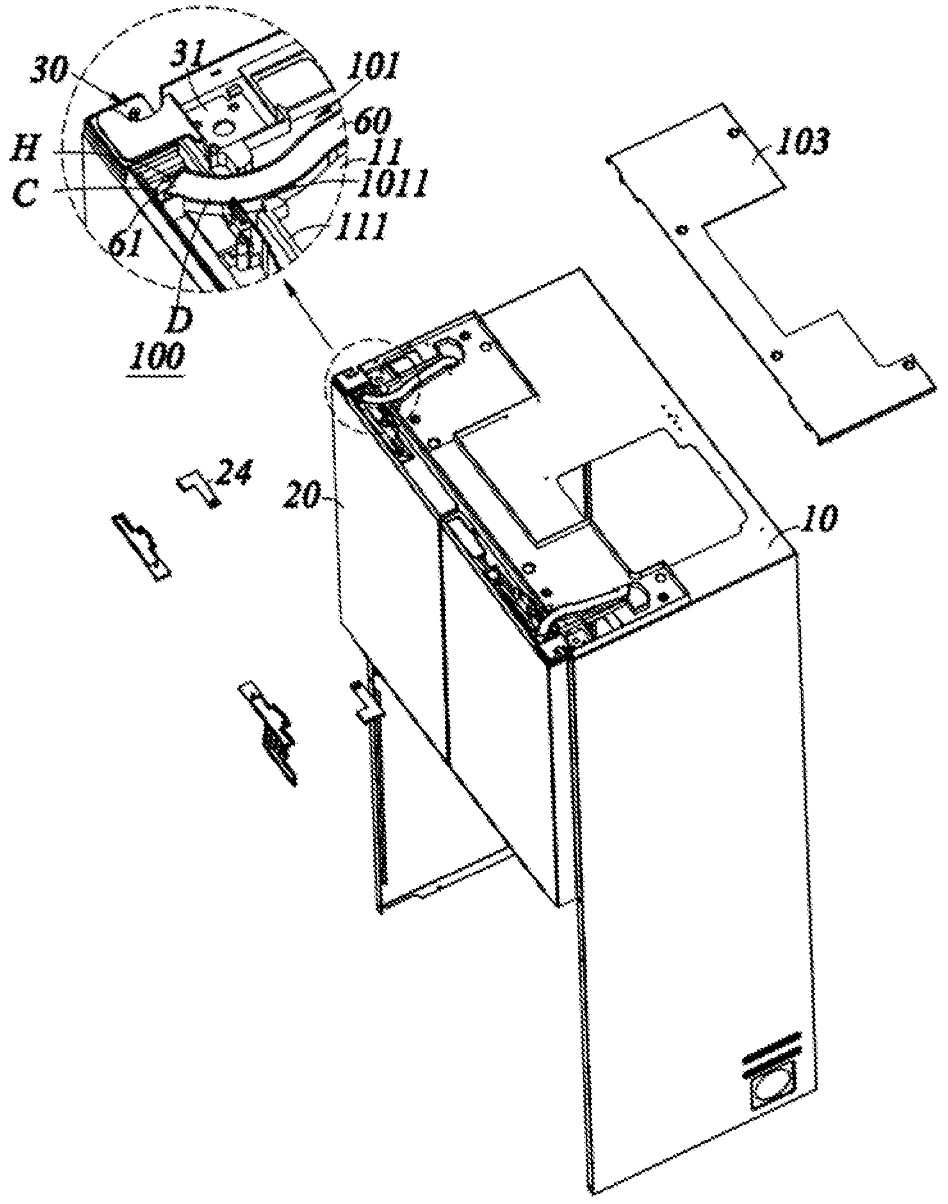
FIG. 40 is a perspective view of the refrigerator with a wiring module according to the first to fourth embodiments of the present invention.
Figure 41:
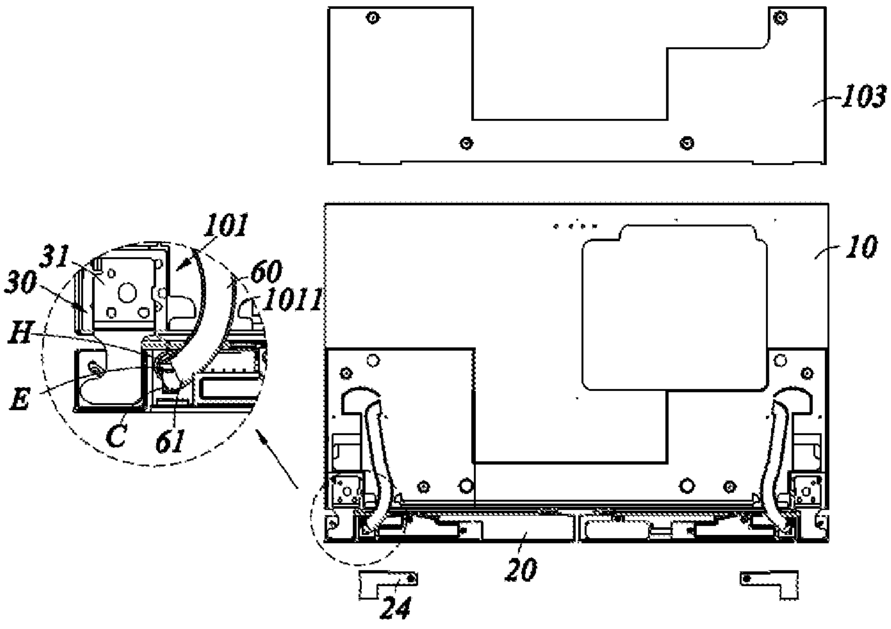
FIG. 41 is a top view of FIG. 40.
Figure 42:
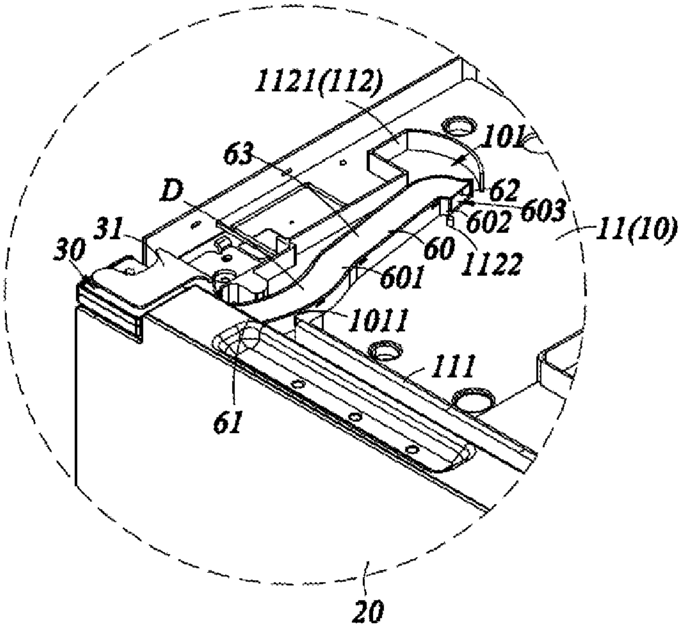
FIG. 42 is a partially enlarged perspective view of the refrigerator with the wiring module according to the first to fourth embodiments of the present invention.
Figure 43:
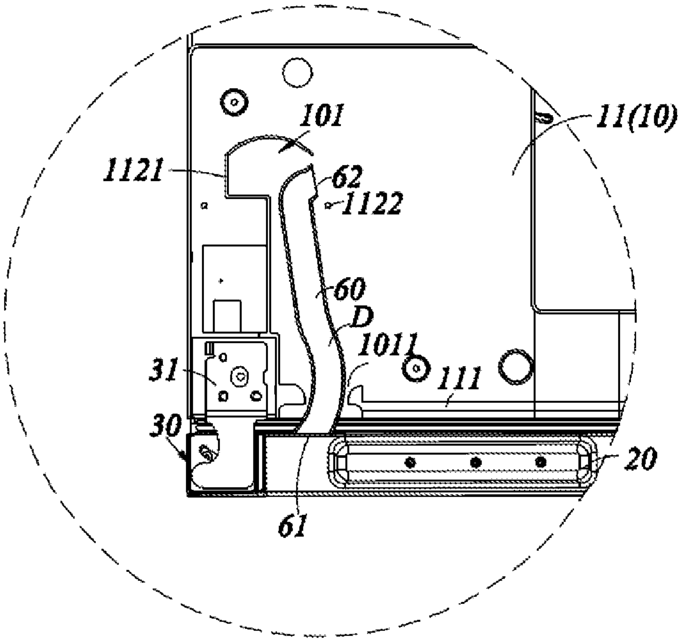
FIG. 43 is a partially enlarged top view (corresponding to the closed state of the door) of the refrigerator with the wiring module according to the first to fourth embodiments of the present invention.
Figure 44:
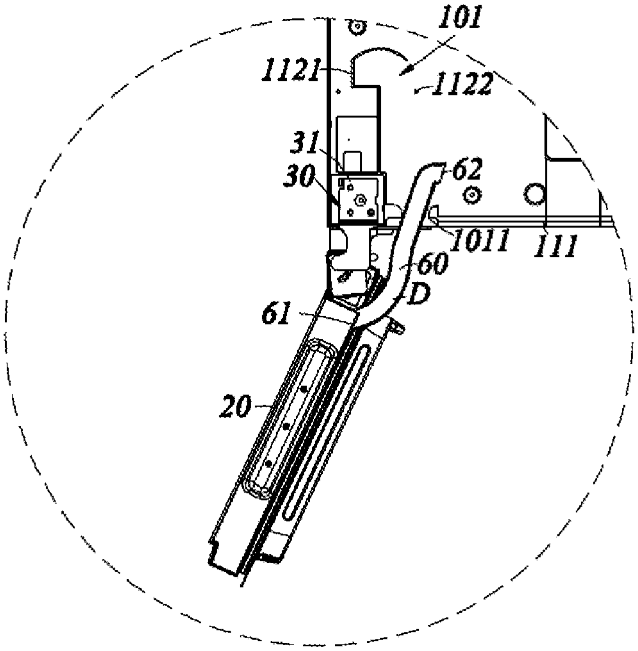
FIG. 44 is a partially enlarged top view (corresponding to an open state of the door) of the refrigerator with the wiring module according to the first to fourth embodiments of the present invention.

In the present embodiment, the hinge assembly 30 is structurally different in different regions of the door 20, the above-mentioned hinge assembly 30 is located between an upper portion of the door 20 and the cabinet 10, and hereinafter, the hinge assembly 30' located between a lower portion of the door 20 and the cabinet 10 will be briefly described with reference to FIGS. 38 and 39.

The lower hinge assembly 30' is different from the upper hinge assembly 30 in that: the first hinge part 31' of the lower hinge assembly 30' has a projection 313', the second hinge part 32' has a corresponding hook 323', and the hook 323' is configured as an elastic part; when the door 20 is in the closed state, the projection 313' acts on the hook 323' to deform, such that the door 20 is in close fit with the cabinet 10, and when the door 20 is in the opening process, the door 20 drives the hook 323' to move, and the hook 323' deforms to be separated from the projection 313'.

That is, when the door 20 is in the closed state, the projection 313' is in interference fit with the hook 323', thus enhancing a closing effect of the door 20.

It should be noted that, since the switching assembly 40' is connected between the first hinge part 31' and the second hinge part 32', the second hinge part 32' further includes an extension section 324' passing through the switching assembly 40' in a thickness direction, and the extension section 324' is connected to the hook 323', such that the hook 323' may be provided horizontally and fitted with the projection 313'.

In the present embodiment, with reference to FIGS. 40 to 44, the refrigerator 100 is configured as a refrigerator 100 with a wiring module 60.

The wiring module 60 includes a fixed end 61 and a free end 62 which are provided oppositely, the fixed end 61 is connected to the door 20, the free end 62 is movably provided at the cabinet 10, and wiring E of the cabinet 10 sequentially passes through the free end 62 and the fixed end 61 and extends to the door 20.

Here, "the free end 62 is movably provided at the cabinet 10" means that the free end 62 is not fixed to the cabinet 10, and as the door 20 is opened, the free end 62 may move relative to the cabinet 10, such that the wiring E in the wiring module 60 may also move freely as the door 20 is opened.

It should be noted that, with intellectualization and multi-functionalization of the refrigerator 100, some functional modules, such as an ice making module, a display module, or the like, are usually provided on the door 20 of the refrigerator 100, and these modules are usually required to be connected with a control module in the cabinet 10 through the wiring E; the wiring E in the present embodiment extends to the door 20 by means of the wiring module 60, which may effectively avoid a phenomenon that the wiring E is pulled in the opening and closing processes of the door 20, and may adapt to the door 20 with various motion tracks; for example, when the hinge assembly 30 drives the door 20 to move from the pivoting side P towards the accommodating chamber S, an extension track of the wiring E also changes, and the present embodiment may completely adapt to the movement of the door 20 using the design of the wiring module 60; that is, the extension track of the wiring E may be flexibly adjusted by the wiring module 60, so as to avoid a wiring jamming problem.

In the present embodiment, the refrigerator 100 further includes a limiting space 101, the limiting space 101 includes a notch 1011 provided towards the door 20, the fixed end 61 of the wiring module 60 passes through the notch 1011 to be connected to the door 20, and when the door 20 is in the opening process, the door 20 drives the wiring module 60 to move in the limiting space 101, and the free end 62 is always located in the limiting space 101.

Here, the limiting space 101 is located at a top 11 of the cabinet 10, the wiring module 60 is provided parallel to the top 11 of the cabinet 10, and the fixed end 61 is movably connected to the door 20; certainly, the limiting space 101 may be provided in other regions.

Specifically, in the present embodiment, the wiring module 60 includes a first housing 601 and a second housing 602, the second housing 602 is provided near the top 11 of the cabinet 10, the first housing 601 is apart from the top 11 of the cabinet 10 relative to the second housing 602, the first housing 601 and the second housing 602 are fitted with each other to form an accommodating cavity 603 for accommodating the wiring E, and two end openings of the accommodating cavity 603 are configured as the fixed end 61 and the free end 62.

The door 20 protrudes upwards from the top 11 of the cabinet 10, an edge of the top 11 close to the door 20 is provided with a stopper 111 protruding from the top 11, the notch 1011 is formed in the stopper 111, the refrigerator 100 includes a plurality of protrusions 112 protruding from the top 11, and the plurality of protrusions 112 enclose the limiting space 101.

Here, the first hinge part 31 is fixed at the edge of the top 11, and in order to adapt to the design of the door 20 protruding from the top 11, the first hinge part 31 of the hinge assembly 30 has a substantial Z shape, such that the first hinge part 31 may extend from the top 11 of the cabinet 10 to a top of the door 20 to be fitted with the switching assembly 40 at the top of the door 20; the plurality of protrusions 112 include a first protrusion 1121 between the first hinge part 31 and the wiring module 60 and a second protrusion 1122 spaced apart from the first protrusion 1121, the first protrusion 1121 may prevent the wiring module 60 from interfering with the first hinge part 31, a profile of the first protrusion 1121 adapts to the motion track of the wiring module 60, and the second protrusions 1122 may be configured as a plurality of convex posts to reduce an impact between the wiring module 60 and the second protrusions 1122.

The refrigerator 100 may further include a cover 103, the cover 103 is located at the top 11 and covers the limiting space 101, the first hinge part 31, or the like, the cover 103 may be fitted with the stopper 111, and a shape of the cover 103 may be determined according to specific requirements.

In addition, the fixed end 61 and the notch 1011 of the wiring module 60 are both provided close to the hinge assembly 30, and it may be understood that in the opening process of the door 20, the wiring module 60 may be exposed in an opening gap of the door 20; the fixed end 61 and the notch 1011 are provided close to the hinge assembly 30, such that on the one hand, the motion track of the wiring module 60 may be controlled reasonably, and on the other hand, the wiring module 60 may be prevented from affecting an appearance and normal use of the refrigerator 100.

The wiring module 60 is provided horizontally and extends to the door 20 through the notch 1011; the door 20 is provided with a wiring hole H, the wiring E extends from the fixed end 61 into the door 20 through the wiring hole H, a region C adjacent to the wiring hole H is pivotally connected to a region of the fixed end 61, and the door 20 includes a lid 24 covering the fixed end 61, the wiring hole H and the region C, such that the wiring module 60 may be movably connected with the door 20; when the door 20 is in the opening process, the door 20 drives the wiring module 60 to move, and the wiring module 60 may move freely according to different tracks in the limiting space 101; that is, the motion track of the wiring module 60 may be completely adapted to the motion track of the door 20, thereby avoiding the wire jamming problem.

In addition, the wiring module 60 includes an arc section D, such that the wiring E may be further prevented from being disturbed in the accommodating cavity 603.

It should be noted that, in order to avoid abrasion and sliding noise of the wiring module 60, a buffer component, a sliding component, or the like, may be provided between the second housing 602 of the wiring module 60 and the top 11 of the cabinet 10, and the specific component may be determined according to actual situations.

In the present embodiment, the notch 1011 of the limiting space 101 has a first notch width, the wiring module 60 includes a movable portion 63 located between the fixed end 61 and the free end 62, and the first notch width is greater than a maximum width of the movable portion 63.

That is, as the door 20 is opened, the movable portion 63 gradually protrudes from the limiting space 101; the first notch width is greater than the maximum width of the movable portion 63, so as to prevent the notch 1011 from limiting the protrusion of the movable portion 63 from the limiting space 101; the notch 1011 may control the motion track of the wiring module 60 to a certain extent, thereby avoiding that the wiring module 60 is separated from the limiting space 101 due to an excessively large motion amplitude.

Here, in order to further prevent the wiring module 60 from being separated from the limiting space 101, the free end 62 may be bent; that is, an included angle is formed between the free end 62 and the movable portion 63.

Second Embodiment

With continued reference to FIGS. 1 to 44 which are schematic diagrams of a refrigerator with a switchable hinge assembly according to the second embodiment of the present invention, for ease of description, similar structures of the second embodiment to the first embodiment are given same or similar numerals.

In the present embodiment, the refrigerator 100 with a switchable hinge assembly includes a cabinet 10, a door 20 for opening and closing the cabinet 10, and the hinge assembly 30 for connecting the cabinet 10 and the door 20; the hinge assembly 30 includes a plurality of hinge parts 31, 32, and a switching assembly 40; when the door 20 is in an opening process, the switching assembly 40 controls the plurality of hinge parts 31, 32 to successively operate in a first sequence, and when the door 20 is in a closing process, the switching assembly 40 controls the plurality of hinge parts 31, 32 to successively operate in a second sequence, and the first sequence is opposite to the second sequence.

Here, the "first sequence" and the "second sequence" refer to sequential orders of operation of the plurality of hinge parts 31, 32.

In the present embodiment, the operating sequence of the plurality of hinge parts 31, 32 may be effectively controlled under the action of the switching assembly 40, thus avoiding mutual interference between the door 20 and a cupboard in the opening and closing processes due to a disorder of the plurality of hinge parts 31, 32; the technology is suitable for the field of embedded refrigerators.

In addition, the plurality of hinge parts 31, 32 may be controlled to operate sequentially under the action of the switching assembly 40, thus effectively improving a stability of the opening and closing processes of the door 20; a motion track of the door 20 may be effectively controlled by switching the plurality of hinge parts 31, 32, so as to adapt to various application scenarios of the refrigerator 100.

It should be emphasized that the structure in the present embodiment is applicable to not only the refrigerator 100 with a switchable hinge assembly 30, but also other scenarios, such as the cupboard, a wine cabinet, a wardrobe, or the like, and the present invention is exemplified with the refrigerator 100 with a switchable hinge assembly, but not limited thereto.

In the present embodiment, for example, the hinge assembly 30 includes a first hinge part 31 and a second hinge part 32; it may be understood that in other embodiments, the hinge assembly 30 may include other numbers of hinge parts; for example, the hinge assembly 30 includes three hinge parts, and the switching assembly 40 controls the switching operation between the three hinge parts, which may be determined according to actual situations.

The switching assembly 40 is connected with the first hinge part 31 and the second hinge part 32, the first hinge part 31 is fixed to the cabinet 10, and the second hinge part 32 is fixed to the door 20; when the door 20 is in the opening process, the first hinge part 31 moves relative to the switching assembly 40 first, and then, the second hinge part 32 moves relative to the switching assembly 40; that is, the first hinge part 31 and the second hinge part 32 operate successively in the first sequence; when the door 20 is in the closing process, the second hinge part 32 moves relative to the switching assembly 40 first, and then, the first hinge part 31 moves relative to the switching assembly 40; that is, the first hinge part 31 and the second hinge part 32 operate successively in the second sequence.

In the present embodiment, the switching assembly 40 includes a first fitting part 41 and a second fitting part 42; when the door 20 is opened from the closed state to a first opening angle $\alpha\mathbf{1}$, the first hinge part 31 and the first fitting part 41 move relatively, and the second fitting part 42 limits the second hinge part 32; when the door 20 is continuously opened from the first opening angle $\alpha\mathbf{1}$ to a second opening angle $\alpha\mathbf{2}$, the second hinge part 32 is released from the limit of the second fitting part 42, and the first fitting part 41 limits the first hinge part 31; when the door 20 is continuously opened from the second opening angle $\alpha\mathbf{2}$ to a maximum opening angle $\alpha\mathbf{3}$, the second hinge part 32 and the second fitting part 42 move relatively.

It may be seen that the switching assembly 40 in the present embodiment may realize locking and unlocking operations of the first hinge part 31 and the second hinge part 32; the first hinge part 31 and the second hinge part 32 may be effectively controlled to operate sequentially by the locking and unlocking operations, such that the first hinge part 31 and the second hinge part 32 may operate in the first sequence in the opening process of the door 20, and in the second sequence in the closing process of the door 20.

In the present embodiment, the switching assembly 40 includes a first switching part 401 and a second switching part 402 which are fitted with each other, the first hinge part 31 and the first fitting part 41 move relatively by a first shaft set 311, 312 and a first groove set 411, 412 which are fitted with each other, and the second hinge part 32 and the second fitting part 42 move relatively by a second shaft set 321, 322 and a second groove set 421, 422 which are fitted with each other.

That is, the sequential switching operation may be realized by cooperation of the double shafts, the double grooves and the switching assembly 40, and certainly, the technology may also be applied to a single-shaft single-groove fitting scenario.

For other descriptions of the hinge assembly 30 in the present embodiment, reference may be made to the description of the first embodiment, and details are not repeated herein; for example, on the premise that the refrigerator 100 is completely embedded in the cupboard 200, the maximum opening angle of the door 20 may be effectively increased, and the refrigerator 100 has the wiring module 60.

It should be noted that the motion track of the door 20 may be effectively controlled by specific designs of the shaft and the groove; in the present embodiment, when the door 20 is in the opening process, the hinge assembly 30 at least drives the door 20 to move from the pivoting side P towards the accommodating chamber S, so as to prevent the door 20 from interfering with the peripheral cupboard or wall, or the like, in the opening process.

Third Embodiment

With continued reference to FIGS. 1 to 44 which are schematic diagrams of an embedded refrigerator according to the third embodiment of the present invention, for ease of description, similar structures of the third embodiment to the first embodiment are given same or similar numerals.

In the present embodiment, the embedded refrigerator 100 includes a cabinet 10, a door 20 for opening and closing the cabinet 10, and a hinge assembly 30 for connecting the cabinet 10 and the door 20; the hinge assembly 30 includes at least a first shaft set and a second shaft set which are staggered, and when the door 20 is in an opening process, the door 20 rotates relative to the first shaft set first, and then, the door rotates relative to the second shaft set.

In the present embodiment, in the opening process of the door 20, the door 20 rotates around different shaft sets, which may effectively increase a degree of freedom of the opening and closing processes of the door 20, thus effectively controlling a motion track of the door 20 to adapt to various application scenarios of the refrigerator 100.

It should be emphasized that the structure in the present embodiment is applicable to not only the embedded refrigerator 100, but also other scenarios, such as a cupboard, a wine cabinet, a wardrobe, or the like, and the present invention is exemplified with the embedded refrigerator 100, but not limited thereto.

Specifically, in the present embodiment, referring to FIG. 25, the first shaft set includes a first rotating shaft 311', the second shaft set includes a second rotating shaft 321', and when the door 20 is in the opening process, the door 20 rotates around the first rotating shaft 311' first, and then, the door 20 rotates around the second rotating shaft 321'.

The cabinet 10 includes an opening 102 and a front end surface 103 provided around the opening 102; the cabinet 10 further includes an accommodating chamber S and an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22; a distance between the first rotating shaft 311' and the front end surface 103 is less than a distance between the second rotating shaft 321' and the front end surface 103, and a distance between the first rotating shaft 311' and the outer side surface 13 is greater than a distance between the second rotating shaft 321' and the outer side surface 13.

Referring to the description of the first embodiment and FIG. 25, when the door 20 is in the opening process, and when the door 20 always rotates around the first rotating shaft 311', referring to the dotted-line door 20' in FIG. 25, since the first rotating shaft 311' is close to the front end surface 103 (that is, apart from the front end 201 of the cupboard 200), after the door 20' is opened to a certain angle, the corner 203 of the cupboard 200 interferes with the door 20' to limit the maximum opening angle of the door 20'.

In the present embodiment, the door 20 rotates around the second rotating shaft 321' in a later period; referring to the solid-line door 20 in FIG. 25, the interference effect of the corner 203 of the cupboard 200 on the door 20 is reduced greatly, and the corner 203 of the cupboard 200 interferes with the door when the door 20 is opened to a larger angle, thereby greatly increasing the maximum opening angle of the door 20.

That is, in the present embodiment, the door 20 may rotate around the second rotating shaft 321' in the later period by switching the rotating shafts, such that the maximum opening angle of the door 20 may be effectively increased on the premise of ensuring that the refrigerator 100 is completely embedded into the cupboard 200, thus facilitating a user to operate the refrigerator 100, and greatly improving user experiences.

In addition, the distance between the first rotating shaft 311' and the outer side surface 13 is greater than the distance between the second rotating shaft 321' and the outer side surface 13, such that the door 20 is apart from the cabinet 10 to increase the opening degree of the cabinet 10.

Certainly, the second rotating shaft 321' may be located at other positions; for example, the distance between the first rotating shaft 311' and the outer side surface 13 is less than or equal to the distance between the second rotating shaft 321' and the outer side surface 13, or the like.

It should be noted that the refrigerator 100 according to the present embodiment may only include the first rotating shaft 311', the second rotating shaft 321', and grooves fitted therewith (i.e., a single-shaft single-groove fitting form); the door 20 may be automatically switched from the first rotating shaft 311' to the second rotating shaft 321' in the opening process, or the first rotating shaft 311' and the second rotating shaft 321' may be switched in cooperation with a switching structure.

Certainly, in the refrigerator 100 according to the present embodiment, the first rotating shaft 311' and the second rotating shaft 321' may be switched in cooperation with the switching assembly 40 in the first embodiment, and at this point, when the door 20 is in the opening process, the switching assembly 40 acts on the door 20 to rotate relative to the first rotating shaft 311' first, and then, the switching assembly 40 acts on the door 20 to rotate relative to the second rotating shaft 321'.

In other embodiments, the hinge assembly 30 includes a first groove set 411, 412 fitted with the first shaft set 311, 312 and a second groove set 421, 422 fitted with the second shaft set 321, 322; when the door 20 is opened from a closed state to a first opening angle α1, the first shaft set 311, 312 and the first groove set 411, 412 move relatively, and the switching assembly 40 locks the second shaft set 321, 322; when the door 20 is continuously opened from the first opening angle α1 to a second opening angle α2, the switching assembly 40 unlocks the second shaft set 321, 322, and the switching assembly 40 locks the first shaft set 311, 312; when the door 20 is continuously opened from the second opening angle α2 to a maximum opening angle α3, the second shaft set 321, 322 and the second groove set 421, 422 move relatively.

Specifically, the first shaft set 311, 312 includes a first shaft 311 and a second shaft 312, the first groove set 411, 412 includes a first groove 411 fitted with the first shaft 311 and a second groove 412 fitted with the second shaft 312, the second shaft set 321, 322 includes a third shaft 321 and a fourth shaft 322, and the second groove set 421, 422 includes a third groove 421 fitted with the third shaft 321 and a fourth groove 422 fitted with the fourth shaft 322.

For other descriptions of the hinge assembly 30 in the present embodiment, reference may be made to the description of the first embodiment, and details are not repeated herein; for example, on the premise that the refrigerator 100 is completely embedded in the cupboard 200, the maximum opening angle of the door 20 may be effectively increased, and the refrigerator 100 has the wiring module 60.

It should be noted that the motion track of the door 20 may be effectively controlled by specific designs of the shaft and the groove; in the present embodiment, when the door 20 is in the opening process, the hinge assembly 30 at least drives the door 20 to move from the pivoting side P towards the accommodating chamber S, so as to prevent the door 20 from interfering with the peripheral cupboard or wall, or the like, in the opening process.

Fourth Embodiment

With continued reference to FIGS. 1 to 44 which are schematic diagrams of a refrigerator with a movable hinge assembly according to the fourth embodiment of the present invention, for ease of description, similar structures of the fourth embodiment to the first embodiment are given same or similar numerals.

In the present embodiment, the refrigerator 100 with a movable hinge assembly includes a cabinet 10 and a door 20 for opening and closing the cabinet 10, the hinge assembly 30 is configured to connect the cabinet 10 and the door 20, and when the door 20 is in an opening process, at least part of the hinge assembly 30 moves relative to the cabinet 10 and the door 20.

Here, "at least part of the hinge assembly 30 moves relative to the cabinet 10 and the door 20" means that at least part of the hinge assembly 30 moves relative to the cabinet 10 and the door 20 at the same time; that is, at least part of the hinge assembly 30 is sandwiched between the cabinet 10 and the door 20 rather than being completely embedded in the cabinet 10 or the door 20.

Generally, in an existing refrigerator structure, the hinge assembly is usually embedded in the cabinet and the door; that is, the hinge assembly is static relative to the cabinet or the door, thus greatly limiting a motion track of the door 20.

In the present embodiment, at least part of the hinge assembly 30 moves relative to the cabinet 10 and the door 20, thus effectively increasing a degree of freedom of the door 20 in the opening and closing processes, and effectively controlling the motion track of the door 20 to adapt to various application scenarios of the refrigerator 100.

It should be emphasized that the structure in the present embodiment is applicable to not only the refrigerator 100 with a movable hinge assembly, but also other scenarios, such as a cupboard, a wine cabinet, a wardrobe, or the like, and the present invention is exemplified with the refrigerator 100 with a movable hinge assembly, but not limited thereto.

In the present embodiment, for example, the hinge assembly 30 includes a first hinge part 31 and a second hinge part 32; it may be understood that in other embodiments, the hinge assembly 30 may include other numbers of hinge parts; for example, the hinge assembly 30 includes three hinge parts, which may be determined according to actual situations.

The hinge assembly 30 further includes a switching assembly 40 connected with the first hinge part 31 and the second hinge part 32, the first hinge part 31 is fixed to the cabinet 10, the second hinge part 32 is fixed to the door 20, and the switching assembly 40 moves relative to the first hinge part 31 and the second hinge part 32 when the door 20 is in the opening process.

That is, the first hinge part 31 is stationary relative to the cabinet 10, the second hinge part 32 is stationary relative to the door 20, and the switching assembly 40 in the hinge assembly 30 moves relative to the cabinet 10 and the door 20; referring to the first embodiment, the switching assembly 40 may be used for the switching operation between the first hinge part 31 and the second hinge part 32, but not limited thereto; the switching assembly 40 in the present embodiment may be used for other purposes as long as the switching assembly 40 may be guaranteed to move relative to the first hinge part 31 and the second hinge part 32.

In the present embodiment, the switching assembly 40 includes a first fitting part 41 and a second fitting part 42; when the door 20 is opened from a closed state to a first opening angle $\alpha 1$, the first hinge part 31 and the first fitting part 41 move relatively, and the second fitting part 42 limits the second hinge part 32; when the door 20 is continuously opened from the first opening angle $\alpha 1$ to a second opening angle $\alpha 2$, the second hinge part 32 is released from the limit of the second fitting part 42, and the first fitting part 41 limits the first hinge part 31; when the door 20 is continuously opened from the second opening angle $\alpha 2$ to a maximum opening angle $\alpha 3$, the second hinge part 32 and the second fitting part 42 move relatively.

In addition, the switching assembly 40 includes a first switching part 401 and a second switching part 402 which are fitted with each other; when the door 20 is opened from the closed state to the first opening angle $\alpha 1$ or continuously opened from the second opening angle $\alpha 2$ to the maximum opening angle $\alpha 3$, the first switching part 401 and the second switching part 402 are relatively stationary, and when the door 20 is continuously opened from the first opening angle $\alpha 1$ to the second opening angle $\alpha 2$, the first switching part 401 moves relative to the second switching part 402, such that the second hinge part 32 is released from the limit of the second fitting part 42, and the first fitting part 41 limits the first hinge part 31.

It may be seen that the switching assembly 40 in the present embodiment may realize locking and unlocking operations of the first hinge part 31 and the second hinge part 32; the first hinge part 31 and the second hinge part 32 may be effectively controlled to operate sequentially by the locking and unlocking operations; the switching assembly 40 moves relative to the first hinge part 31 and the second hinge part 32 to achieve the locking and unlocking functions, and a movement process of the switching assembly 40 greatly expands functions of the hinge assembly 30, such that the hinge assembly 30 has a wider application range.

In addition, the first hinge part 31 and the first fitting part 41 move relatively by a first shaft set 311, 312 and a first groove set 411, 412 which are fitted with each other, and the second hinge part 32 and the second fitting part 42 move relatively by a second shaft set 321, 322 and a second groove set 421, 422 which are fitted with each other.

That is, the movement of the hinge assembly 30 relative to the cabinet 10 and the door 20 may be realized by cooperation of the double shafts, the double grooves and the switching assembly 40, and certainly, the technology may also be applied to a single-shaft single-groove fitting scenario.

For other descriptions of the hinge assembly 30 in the present embodiment, reference may be made to the description of the first embodiment, and details are not repeated herein; for example, on the premise that the refrigerator 100 is completely embedded in the cupboard 200, the maximum opening angle of the door 20 may be effectively increased, and the refrigerator 100 has the wiring module 60.

It should be noted that the motion track of the door 20 may be effectively controlled by specific designs of the shaft and the groove; in the present embodiment, when the door 20 is in the opening process, the hinge assembly 30 at least drives the door 20 to move from the pivoting side P towards the accommodating chamber S, so as to prevent the door 20 from interfering with the peripheral cupboard or wall, or the like, in the opening process.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A refrigerator with a switchable hinge assembly, comprising: a cabinet, a door for opening and closing the cabinet, and the hinge assembly for connecting the cabinet and the door, wherein the hinge assembly comprises a plurality of hinge parts, and a switching assembly; when the door is in an opening process, the switching assembly controls the plurality of hinge parts to successively operate in a first sequence, and when the door is in a closing process, the switching assembly controls the plurality of hinge parts to successively operate in a second sequence, and the first sequence is opposite to the second sequence;

the hinge assembly comprises a first hinge part and a second hinge part, the switching assembly is connected with the first hinge part and the second hinge part, the first hinge part is fixed to the cabinet, and the second hinge part is fixed to the door; when the door is in the opening process, the switching assembly moves relative to the first hinge part first, and then, the second hinge part moves relative to the switching assembly; when the door is in the closing process, the second hinge part moves relative to the switching assembly first, and then, the switching assembly moves relative to the first hinge part; the switching assembly comprises a first fitting part and a second fitting part; when the door is opened from a closed state to a first opening angle, the first hinge part and the first fitting part move relatively, and the second fitting part limits the second hinge part; when the door is continuously opened from the first opening angle to a second opening angle, the second hinge part is released from limit of the second fitting part, and relative movement between the first fitting part and the first hinge part is limited; when the door is continuously opened from the second opening angle to a maximum opening angle, the second hinge part and the second fitting part move relatively; the first hinge part and the first fitting part move relatively by a first shaft set and a first groove set which are fitted with each other, and the second hinge part and the second fitting part move relatively by a second shaft set and a second groove set which are fitted with each other;

wherein the first shaft set comprises a first shaft and a second shaft, the first groove set comprises a first groove fitted with the first shaft and a second groove fitted with the second shaft, the second shaft set comprises a third shaft and a fourth shaft, and the second groove set comprises a third groove fitted with the third shaft and a fourth groove fitted with the fourth shaft.

2. The refrigerator with a switchable hinge assembly according to claim 1, wherein the cabinet comprises an accommodating chamber and a pivoting side connected with the hinge assembly, and when the door is in the opening process, the hinge assembly at least drives the door to move from the pivoting side towards the accommodating chamber.

3. The refrigerator with a switchable hinge assembly according to claim 1, wherein the switching assembly comprises a first switching part having the first fitting part disposed therein and a second switching part having the second fitting part disposed therein, the first and second switching parts are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second hinge part is released from the limit of the second fitting part, and the relative movement between the first fitting part and the first hinge part is limited.

4. The refrigerator with a switchable hinge assembly according to claim 3, wherein the first switching part comprises a first lining, a first sliding sheet and a first bushing which are stacked sequentially, and the second switching part comprises a second lining, a second sliding sheet and a second bushing which are stacked sequentially; the first lining, the first bushing, the second lining and the second bushing are made of plastic, and the first sliding sheet and the second sliding sheet are made of metal.

5. The refrigerator with a switchable hinge assembly according to claim 4, wherein the first switching part further comprises a first decorative sheet covering peripheries of the first lining, the first sliding sheet, and the first bushing, the second switching part further comprises a second decorative sheet covering peripheries of the second lining, the second sliding sheet, and the second bushing, and the first decorative sheet and the second decorative sheet are separated from each other.

6. The refrigerator with a switchable hinge assembly according to claim 1, wherein the first hinge part comprises the first shaft and the second shaft, the first fitting part comprises the first groove and the second groove, the second fitting part comprises the third shaft and the fourth shaft, and the second hinge part comprises the third groove and the fourth groove.

7. The refrigerator with a switchable hinge assembly according to claim 6, wherein the first groove comprises a first upper groove located at the first switching part and a first lower groove located at the second switching part, the first upper groove comprises a first upper free section, and the first lower groove comprises a first lower free section; the second groove comprises a second upper groove located at the first switching part and a second lower groove located at the second switching part, the second upper groove comprises a second upper free section, the second lower groove comprises a second lower free section, the third groove comprises a third free section, the fourth groove comprises a fourth free section, the first groove set comprises a locking section, and the second groove set comprises a limiting section; when the door is opened from the closed state to the first opening angle, the first switching part and the second switching part are relatively stationary, the first upper free section and the first lower free section are overlapped to form a first free section, the second upper free section and the second lower free section are overlapped to form a second free section, the first shaft is at the first free section, and the switching assembly moves relatively to the first shaft, the second shaft is at the second free section, and the switching assembly moves relatively to the second shaft, and the third shaft and/or the fourth shaft are/is limited at the limiting section, such that the switching assembly limits the second hinge part; when the door is continuously opened from the first opening angle to the second opening angle, the first switching part and the second switching part move relatively, such that the second hinge part is released from the limit of the switching assembly, and the first shaft and/or the second shaft stay/stays at the locking section, such that the switching assembly is limited against the first hinge part; when the door is continuously opened from the second opening angle to the maximum opening angle, the third shaft moves at the third free section, and the fourth shaft moves at the fourth free section.

8. The refrigerator with a switchable hinge assembly according to claim 7, wherein the locking section comprises a first upper locking section located at the first upper groove, a first lower locking section located at the first lower groove, a second upper locking section located at the second upper groove, and a second lower locking section located at the second lower groove, and the limiting section comprises a fourth limiting section located at the fourth groove; when the door is opened from the closed state to the first opening angle, the fourth shaft is limited at the fourth limiting section; when the door is continuously opened from the first opening angle to the second opening angle, the first shaft stays at the first upper locking section and the first lower locking section at the same time, the second shaft stays at the second upper locking section and the second lower locking section at the same time, and the fourth shaft is separated from the fourth limiting section.

9. The refrigerator with a switchable hinge assembly according to claim 8, wherein the first upper locking section and the first lower locking section are always staggered, and the second upper locking section and the second lower locking section are always staggered.

10. The refrigerator with a switchable hinge assembly according to claim 7, wherein the first switching part and the second switching part are fitted and connected with each other by a fifth shaft, and when the door is continuously opened from the first opening angle to the second opening angle, the switching assembly moves to relocate the first shaft to the locking section around the fifth shaft.

11. The refrigerator with a switchable hinge assembly according to claim 7, wherein the first switching part is closer to the first hinge part than the second switching part.

12. The refrigerator with a switchable hinge assembly according to claim 11, wherein the first switching part comprises the third shaft, the second switching part has a through hole, the third shaft extends through the through hole to the third groove, the second switching part comprises the fourth shaft, and the fourth shaft extends to the fourth groove.

13. The refrigerator with a switchable hinge assembly according to claim 7, wherein the cabinet comprises an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

14. The refrigerator with a switchable hinge assembly according to claim 13, wherein the refrigerator further comprises an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

* * * * *